United States Patent
Chai et al.

(10) Patent No.: US 9,505,428 B2
(45) Date of Patent: Nov. 29, 2016

(54) STEERING CONTROL DEVICE

(71) Applicant: NISSAN MOTOR CO., LTD., Yokohama-shi, Kanagawa (JP)

(72) Inventors: Yu Wun Chai, Isehara (JP); Kazuhiro Igarashi, Ebina (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/760,084

(22) PCT Filed: Dec. 27, 2013

(86) PCT No.: PCT/JP2013/007690
§ 371 (c)(1),
(2) Date: Jul. 9, 2015

(87) PCT Pub. No.: WO2014/108984
PCT Pub. Date: Jul. 17, 2014

(65) Prior Publication Data
US 2015/0353126 A1    Dec. 10, 2015

(30) Foreign Application Priority Data
Jan. 11, 2013  (JP) .................................. 2013-003874

(51) Int. Cl.
| | | |
|---|---|---|
| *B62D 5/04* | (2006.01) |
| *B62D 6/08* | (2006.01) |
| *B62D 6/04* | (2006.01) |
| *B62D 6/02* | (2006.01) |
| *B62D 6/00* | (2006.01) |

(52) U.S. Cl.
CPC ............. *B62D 5/0463* (2013.01); *B62D 6/008* (2013.01); *B62D 6/02* (2013.01); *B62D 6/04* (2013.01); *B62D 6/08* (2013.01)

(58) Field of Classification Search
CPC ........ B62D 5/0463; B62D 6/02; B62D 6/08; B62D 6/04; B62D 6/008
See application file for complete search history.

(56) References Cited

U.S. PATENT DOCUMENTS

| | | | | |
|---|---|---|---|---|
| 6,415,215 | B1 * | 7/2002 | Nishizaki .............. | B60T 8/1755 180/167 |
| 2003/0055545 | A1 * | 3/2003 | Uenuma ................ | B62D 6/008 701/41 |
| 2004/0148078 | A1 * | 7/2004 | Nakano .................. | B60C 23/00 701/41 |
| 2006/0080016 | A1 | 4/2006 | Kasahara et al. | |
| 2008/0251312 | A1 * | 10/2008 | Goto ..................... | B62D 6/003 180/446 |
| 2010/0138112 | A1 * | 6/2010 | Suzuki .................. | B62D 6/002 701/42 |
| 2014/0316658 | A1 | 10/2014 | Chai et al. | |

FOREIGN PATENT DOCUMENTS

| | | |
|---|---|---|
| CN | 103906671 A | 7/2014 |
| JP | 2000108914 A | 4/2000 |
| JP | 2004189119 A | 7/2004 |
| JP | 2006111099 A | 4/2006 |
| JP | 2006137215 A | 6/2006 |
| JP | 2007050743 A | 3/2007 |
| JP | 2012240456 A | 12/2012 |

* cited by examiner

*Primary Examiner* — Rodney Butler
(74) *Attorney, Agent, or Firm* — Young Basile Hanlon & MacFarlane, P.C.

(57) ABSTRACT

A control computing unit blends a feedforward axial force and a feedback axial force at an allocation ratio, based on an axial force difference, a lateral acceleration, a vehicle velocity, a steering angle, and a steering angular velocity so as to set a final axial force. Then, the control computing unit applies a steering reaction force based on the final axial force that has been set.

5 Claims, 13 Drawing Sheets

STEERING CONTROL DEVICE

CROSS REFERENCE TO RELATED APPLICATION

This application claims priority from Japanese Patent Application No. 2013-3874 (filed on Jan. 11, 2013), which is incorporated herein by reference in its entirety.

TECHNICAL FIELD

The present disclosure relates to a steering control device of Steer By Wire system, in which a steering wheel and steered wheels are mechanically separated from each other.

BACKGROUND

As a technology of the steering control device, for example, Patent Literature 1 is given in one technology. In JP 2000-108914 A, the reaction force motor is driven based on a control amount of the steering reaction force based on the steering angle and a control amount calculated by multiplying electric current of the steering motor by a setting gain. Thus, in JP 2000-108914 A, an influence of an external force made on steered wheels is reflected on a steering reaction force.

In the above-described technology, however, the reaction force motor is driven based on the control amount of the steering reaction force based on the steering angle and the control amount calculated by multiplying the electric current of the steering motor by a setting gain. Therefore, in the above-described technology, for example, in a case where the accuracy of the control amount of the steering reaction force based on the steering angle degrades, there is a possibility that the steering reaction force is inappropriate.

SUMMARY

The present disclosure has been made in view of the above circumstances, and has an object of being capable of applying a more appropriate steering reaction force.

In order to achieve the above object, in one embodiment of the present disclosure, a feedforward axial force and a feedback axial force are allocated at an allocation ratio to set a final axial force. Then, in one embodiment of the disclosure, the steering reaction is applied based on the final axial force that has been set. In such a case, when there is an axial force difference between the feedforward axial force and feedback axial force, the allocation ratio of the feedforward axial force is made smaller in a case where the absolute value of the axial force difference is equal to or a setting value than the allocation ratio in a case where the absolute value of the axial force difference is smaller than the setting value.

In one embodiment of the present disclosure, since the feedforward axial force and the feedback axial force are allocated at an allocation ratio based on the axial force difference, the lateral direction acceleration, the vehicle velocity, the steering angle, and the steering angular velocity, it is possible to blend the feedforward axial force and the feedback axial force in a more appropriate manner.

Accordingly, in one embodiment of the disclosure, a more appropriate steering reaction force can be applied.

DETAILED DESCRIPTION OF THE EMBODIMENTS

Next, embodiments of the present disclosure will be described with reference to the drawings.

(Configuration)

A vehicle A is a vehicle including a steering control device of Steer By Wire system in which the steering wheel 1 and front wheels (hereinafter, also referred to as steered wheels) 2 are mechanically separated, in one embodiment of the present disclosure.

Figure 1:
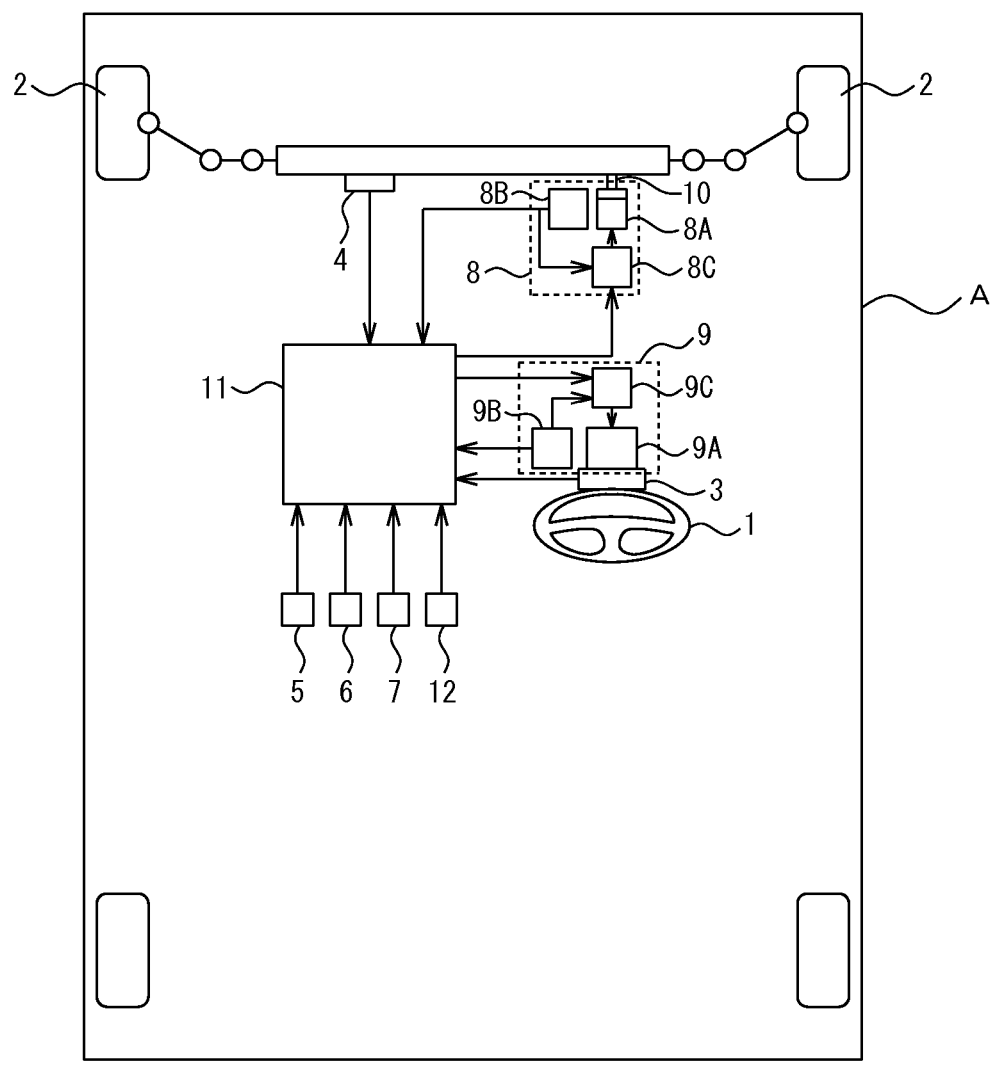
FIG. 1 is a conceptual view illustrative of a configuration of a vehicle A.

FIG. 1 is a conceptual view illustrative of a configuration of a vehicle A, in one embodiment of the present disclosure. As illustrated in FIG. 1, the vehicle A is configured to include a steering angle sensor 3, a turning angle sensor 4, a vehicle velocity sensor 5, a lateral G sensor 6, a yaw rate sensor 7, and a shift sensor 12.

The steering angle sensor 3 is configured to detect a steering angle δ of the steering wheel 1. As a method of detecting the steering angle δ, for example, a method of calculating the angle based on a rotation amount of the steering shaft can be used. Then, the steering angle sensor 3 is configured to output a signal (hereinafter, also referred to as detection signal) representing a detection result to a control computing unit 11 to be described below.

The turning angle sensor 4 is configured to detect a turning angle θ of the steered wheels 2. As a method of detecting the turning angle θ, for example, a method of calculating the angle based on a rack movement amount of the steering rack can be used. Then, the turning angle sensor 4 is configured to output a detection signal to the control computing unit 11.

The vehicle velocity sensor 5 is configured detect a vehicle velocity V of the vehicle A. Then, the vehicle velocity sensor 5 is configured to output a detection signal to the control computing unit 11. The lateral G sensor 6 is configured to detect a lateral acceleration Gy to be exerted on the vehicle A (a state amount of the vehicle A that changes depending on a tire lateral force Fd applied on the steered wheels 2). Then, the lateral G sensor 6 is configured to output a detection signal to the control computing unit 11.

The yaw rate sensor 7 is configured to detect a yaw rate γ of the vehicle A (a state amount of the vehicle A that changes depending on the tire lateral force Fd applied on the steered wheels 2). Then, the yaw rate sensor 7 is configured to output a detection signal to the control computing unit 11. It is to be noted that the lateral G sensor 6 and the yaw rate sensor 7 are arranged at a spring (a vehicle body).

The shift sensor 12 is configured to detect a position of the shift lever of the velocity change gear. As the position of the shift lever, for example, D range, R range (position of traveling rearward), and P range are included. Then, the shift sensor 12 is configured to output a detection signal to the control computing unit 11.

In addition, the vehicle A is configured to include a turning control unit 8, and a reaction force control unit 9. The turning control unit 8 is configured to include a turning motor 8A, a turning current detecting unit 8B, and a turning motor drive unit 8C.

The turning motor 8A is coupled with a pinion shaft 10 through the reduction gear. Then, the turning motor 8A is driven by the turning motor drive unit 8C to move the steering rack to the left or right through the pinion shaft 10. In this manner, the turning motor 8A turns the steered wheels 2. As a method of driving the turning motor 8A, for example, a method of controlling the electric current flowing across the turning motor 8A (hereinafter, also referred to as turning electric current) can be used.

The turning current detecting unit 8B is configured to detect the turning electric current (a state amount of the vehicle A that changes depending on the tire lateral force Fd applied on the steered wheels 2). Then, the turning current detecting unit 8B is configured to output a detection signal to the turning motor drive unit 8C and the control computing unit 11.

The turning motor drive unit 8C is configured to control the turning electric current of the turning motor 8A based on a target turning electric current calculated by the control computing unit 11, so that the turning electric current detected by the turning current detecting unit 8B conforms with the target turning electric current. In this manner, the turning motor drive unit 8C drives the turning motor 8A. The target turning electric current is a target value of the electric current flowing across the turning motor 8A.

The reaction force control unit 9 is configured to include a reaction force motor 9A, a reaction force current detecting unit 9B, and a reaction force motor drive unit 9C. The reaction force motor 9A is coupled with the steering shaft through the reduction gear. Then, the reaction force motor 9A is driven by the reaction force motor drive unit 9C to apply the rotational torque to the steering wheel 1 through the steering shaft. Accordingly, the reaction force motor 9A generates a steering reaction force. As a method of driving the reaction force motor 9A, for example, a method of controlling the electric current flowing across the reaction force motor 9A (hereinafter, also referred to as reaction force electric current) can be used.

The reaction force current detecting unit 9B is configured to detect a reaction force electric current. Then, the reaction force current detecting unit 9B is configured to output a detection signal to the reaction force motor drive unit 9C and the control computing unit 11.

The reaction force motor drive unit 9C is configured to control the reaction force electric current of the reaction force motor 9A based on a target reaction force electric current calculated by the control computing unit 11, so that the reaction force electric current detected by the reaction force current detecting unit 9B conforms with the target reaction force electric current. Accordingly, the reaction force motor drive unit 9C drives the reaction force motor 9A. The target reaction force electric current is a target value of the electric current flowing across the reaction force motor 9A.

Figure 2:
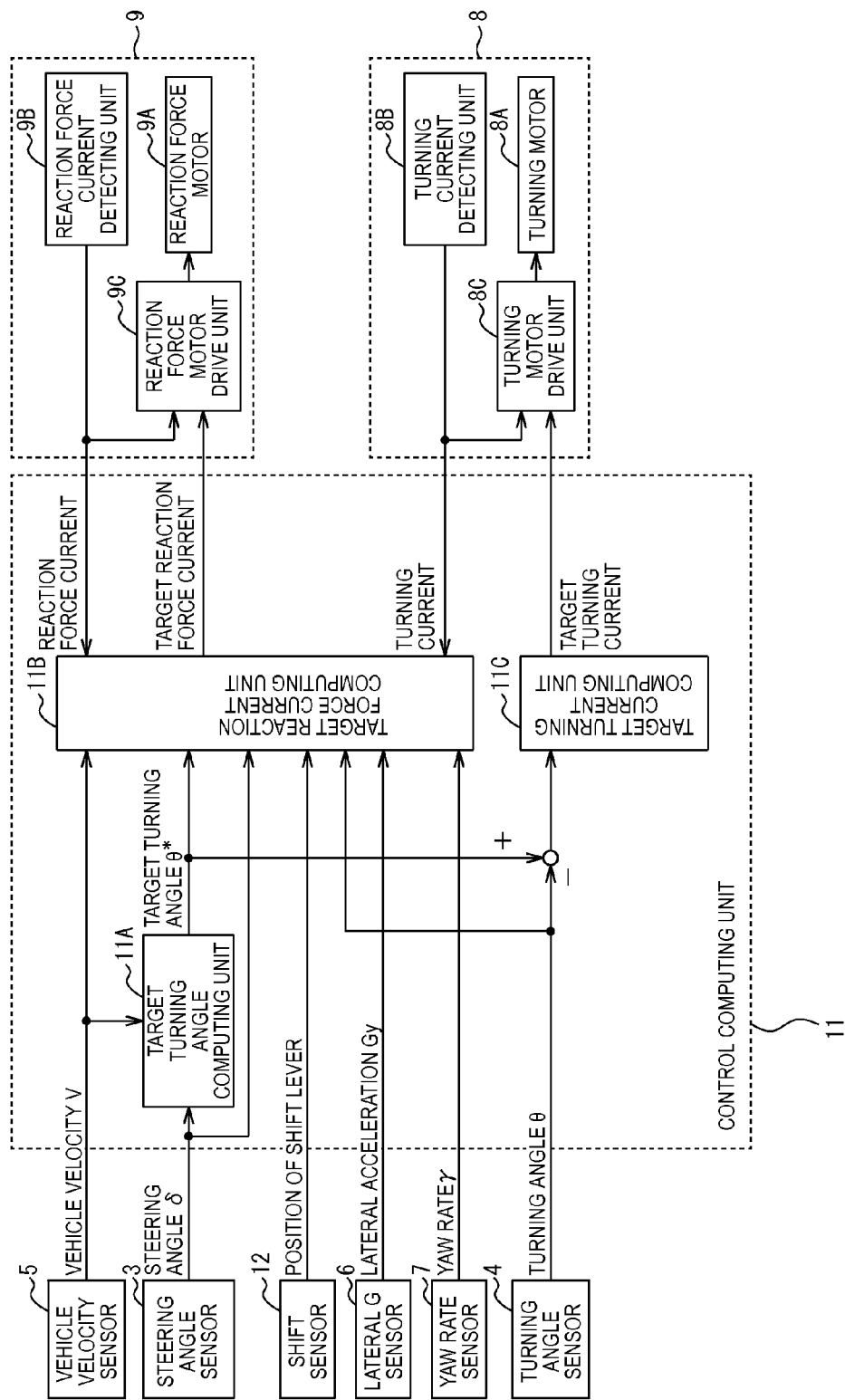
FIG. 2 is a block diagram illustrative of a configuration of a control computing unit 11.

In addition, the vehicle A includes a control computing unit 11. FIG. 2 is a block diagram illustrative of a configuration of the control computing unit 11. As illustrated in FIG. 2, the control computing unit 11 is configured to include a target turning angle computing unit 11A, a target reaction force current computing unit 11B, and a target turning current computing unit 11C.

The target turning angle computing unit 11A is configured to calculate a target turning angle θ*, which is a target value of a turning angle θ (a rotational angle of the pinion shaft 10) based on the steering angle δ detected by the steering angle sensor 3 and the vehicle velocity V detected by the vehicle velocity sensor 5. As a method of calculating the target turning angle θ*, for example, there is a method of using a multiplication value obtained by multiplying the steering angle δ by a variable gear ratio of the steering angle δ and the turning angle θ. Then, the target turning angle computing unit 11A is configured to output a calculation result to the target reaction force current computing unit 11B.

The target reaction force current computing unit 11B is configured to calculate a target reaction force electric current based on the target turning θ* calculated by the target turning angle computing unit 11A, the vehicle velocity V detected by the vehicle velocity sensor 5, and the turning electric current detected by the turning current detecting unit 8B. Then, the target reaction force current computing unit 11B is configured to output a calculation result to the reaction force control unit 9 (a reaction force motor drive unit 9C).

Figure 3:
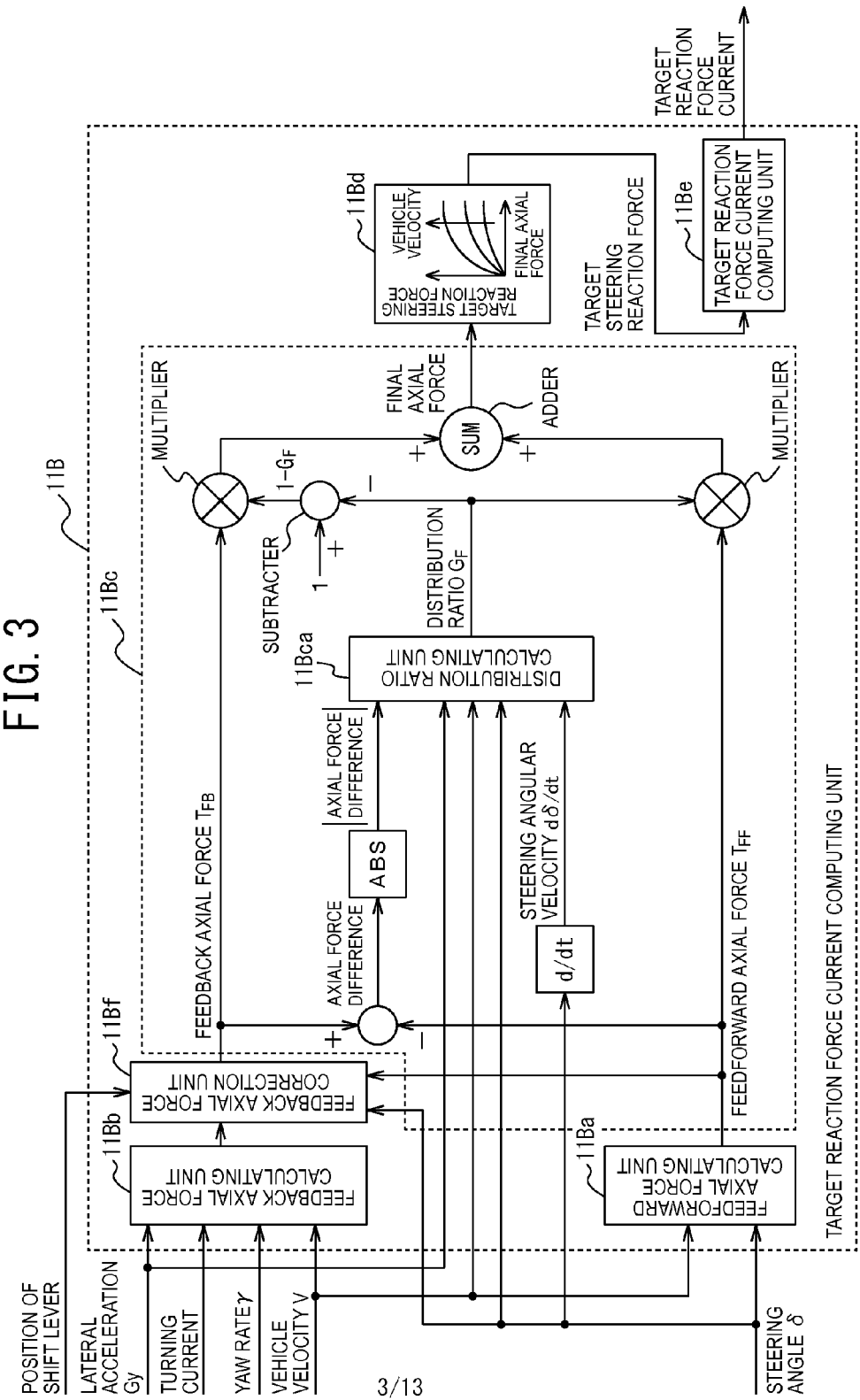
FIG. 3 is a block diagram illustrative of a configuration of a target reaction force current computing unit 11B.

Here, a configuration of the target reaction force current computing unit 11B will be described. FIG. 3 is a block diagram illustrative of a configuration of the target reaction force current computing unit 11B. As illustrated in FIG. 3, the target reaction force current computing unit 11B is configured to include a feedforward axial force calculating unit 11Ba, a feedback axial force calculating unit 11Bb, a feedback axial force correcting unit 11Bf, a final axial force calculating unit 11Bc, an axial force-steering reaction force converting unit 11Bd, and a target reaction force current computing unit 11Be.

Figure 4:
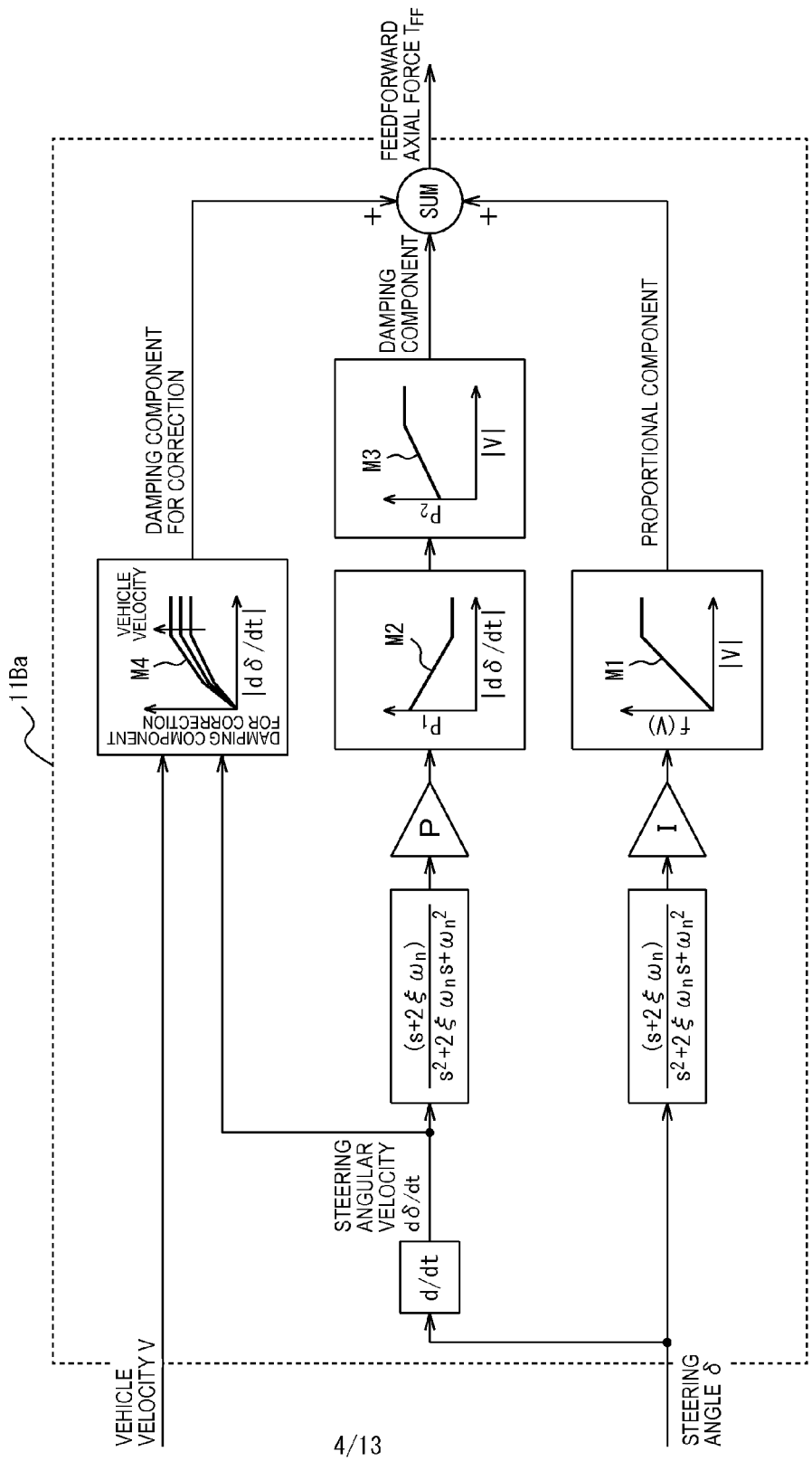
FIG. 4 is a block diagram illustrative of a configuration of feedforward axial force calculating unit 11Ba.

FIG. 4 is a block diagram illustrative of a configuration of the feedforward axial force calculating unit 11Ba. As illustrated in FIG. 4, the feedforward axial force calculating unit 11Ba is configured to calculate a steering reaction force as a feedforward axial force $T_{FF}$ according to expression (5) to be described below, based on the steering angle δ detected by the steering angle sensor 3 and the vehicle velocity V detected by the vehicle velocity sensor 5. Then, the feedforward axial force calculating unit 11Ba is configured to output a calculation result to the final axial force calculating unit 11Bc (see FIG. 2).

Figure 5:
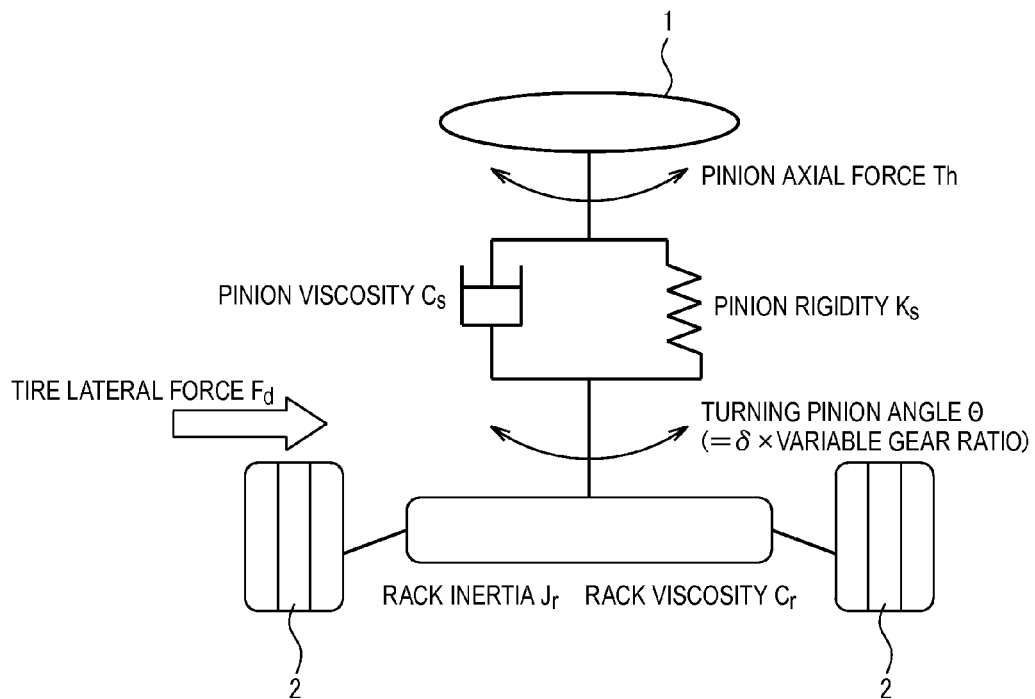
FIG. 5 is a view illustrative of coefficients in a calculation expression of a pinion axial force Th.

FIG. 5 is a view illustrative of coefficients in a calculation expression of a pinion axial force Th. Here, the relational expression between a turning pinion angle θ and the pinion axial force Th is represented by the following expression (1) based on an equation of motion of the vehicle including the steering mechanism where the steering wheel 1 and the steered wheels 2 are mechanically connected. As the turning pinion angle θ, a rotational angle of the pinion shaft 10 is given as an example. To be specific, the turning pinion angle θ is set to a multiplication value obtained by multiplying the steering angle δ and the variable gear ratio of the steering angle δ and turning angle θ. Also, as the pinion axial force Th, a steering reaction force applied to the steering wheel 1 is given as an example. The first item on the right side of the following expression (1) is a damping item representing a component based on a turning pinion angular velocity dθ/dt in the components included in the pinion axial force Th. In addition, the second item on the right side is an inertial item representing a component based on a turning pinion angular acceleration $d^2θ/dt^2$ in the components included in the pinion axial force Th. Further, the third item on the right side is a proportion item representing a component based on the tire lateral force Fd (a turning pinion angle θ) in the components included in the pinion axial force Th.

$$Th=Ks(Jrs^2+Cr\cdot s)/(Jr\cdot s^2+(Cr+Cs)s+Ks)\cdot θ+Cs(Jrs^3+Cr\cdot s^2)/(Jr\cdot s^2+(Cr+Cs)s+Ks)\cdot θ+(Ks+Cs\cdot s)/(Jr\cdot s^2+(Cr+Cs)s+Ks)\cdot Fd \quad (1)$$

As illustrated in FIG. 5, Ks represents pinion rigidity, Cs represents pinion viscosity, Jr represents rack inertia, and Cr represents rack viscosity. In addition, in the above expression (1), the second item on the right side, which is the inertial item and includes a lot of noise components, and they should be removed because they induce oscillation for the calculation result of the pinion axial force Th. Moreover, the tire lateral force Fd can be represented by Fd=f(V)·θ as one depending on the turning pinion angle θ and the vehicle velocity V. As f(V), for example, there is a function that changes depending on the vehicle velocity V. Accordingly, the expression (1) can be represented by the following expression (2).

$$Th=Ks(Jrs^2+Cr\cdot s)/(Jr\cdot s^2+(Cr+Cs)s+Ks)\cdot θ+(Ks+Cs\cdot s)/(Jr\cdot s^2+(Cr+Cs)s+Ks)\cdot f(V)\cdot θ \quad (2)$$

Figure 6:
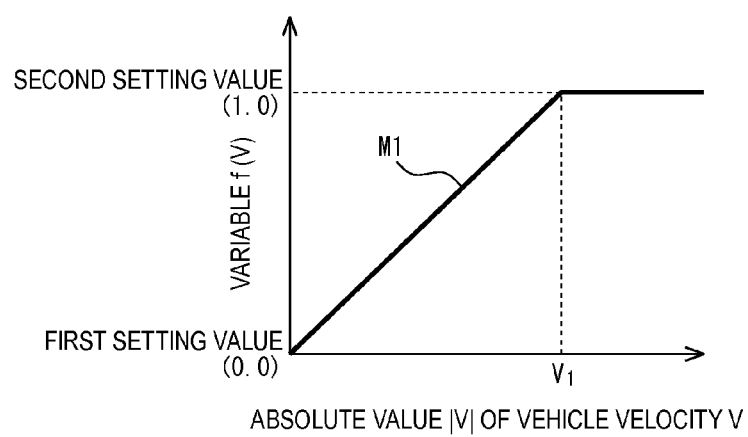
FIG. 6 is a graph representing a control map M1.

FIG. 6 is a graph representing a control map M1. Here, as a method of setting the variable f(V), for example, a method of reading the variable f(V) corresponding to the absolute value of the vehicle velocity V from the control map M1 can be used. As the control map M1, a map in which the variables f(V) corresponding to the absolute values of the vehicle velocities V are registered is given as an example. To be specific, as illustrated in FIG. 6, in the control map M1, when the absolute value of the vehicle velocity V is 0, variable f(V) is set to a first setting value (for example, 0.0). Also, in a range where the absolute value of the vehicle velocity V is equal to or larger than a first setting vehicle velocity $V_1$ (>0), the variable f(V) is set to a second setting value (>the first setting value. For example, 1.0) regardless of the magnitude of the vehicle velocity V. Furthermore, in the control map M1, in a range where the absolute value of the vehicle velocity V is equal to or larger than 0 and smaller than the first setting vehicle velocity $V_1$, the variable f(V) is linearly increased according to the absolute value of the turning angular velocity dθ/dt. To be specific, in the control map M1, in the range where the absolute value of the vehicle velocity V is equal to or larger than 0 and smaller than the first setting vehicle velocity $V_1$, the variable f(V) is set according to a linear function representing a relationship between the absolute value of the vehicle velocity V and the variable f(V). In the linear function, when the absolute value of the vehicle velocity V is 0, the variable f(V) is set to the first setting value (0.0), whereas when the absolute value of the vehicle velocity V is the first setting vehicle velocity $V_1$, the variable f(V) is set to the second setting value (1.0). Accordingly, when the absolute value of the vehicle velocity V is smaller than the first setting vehicle velocity $V_1$, the feedforward axial force calculating unit 11Ba makes smaller (reduces) the absolute value of a proportional component, as the absolute value of vehicle velocity V is smaller. In addition, when the absolute value of the vehicle velocity V is equal to or larger than the first setting vehicle velocity $V_1$, the feedforward axial force calculating unit 11Ba does not reduce the absolute value of the proportional component regardless of the magnitude of the vehicle velocity V.

Further, the expression (2) can be represented as following expression (3) equivalently.

$$Th = P(s+2\cdot ζ\cdot ωn)s/(s^2+2\cdot ζ\cdot ωn\cdot s+ωn^2)δ + \quad (3)$$
$$I\cdot(s+2\cdot ζ\cdot ωn)/(s^2+2\cdot ζ\cdot ωn\cdot s+ωn^2)\cdot f(V)\cdot δ =$$
$$P(s+2\cdot ζ\cdot ωn)/(s^2+2\cdot ζ\cdot ωn\cdot s+ωn^2)dδ/dt +$$
$$I\cdot(s+2\cdot ζ\cdot ωn)/(s^2+2\cdot ζ\cdot ωn\cdot s+ωn^2)\cdot f(V)\cdot δ$$

where P and I represent control parameters, ζ represents a damping coefficient, and ωn represents a natural frequency. As a method of setting ζ and ωn, for example, a method of setting with a design value or a method of identifying from an experimental result can be used.

Therefore, the pinion axial force Th, which is the steering reaction force generated at the steering wheel 1 can be represented by the following expression (4) based on the expression (3).

$$Th=P(s+2\cdot ζ\cdot ωn)/(s^2+2\cdot ζ\cdot ωn\cdot s+ωn^2)dδ/dt+I\cdot(s+2\cdot ζ\cdot ωn)/(s^2+2\cdot ζ\cdot ωn\cdot s+ωn^2)\cdot f(V)\cdot δ \quad (4)$$

Then, as a method of calculating a feedforward axial force $T_{FF}$ based on the above expression (4), that is the arithmetic expression of the pinion axial force Th, in one embodiment of the present disclosure, the following expression (5) is used.

$$T_{FF}=P\cdot P_1\cdot P_2(s+2\cdot ζ\cdot ωn)/(s^2+2\cdot ζ\cdot ωn\cdot s+ωn^2)dδ/dt+I\cdot(s+2\cdot ζ\cdot ωn)/(s^2+2\cdot ζ\cdot ωn\cdot s+ωn^2)\cdot f(V)\cdot δ+\text{damping component for correction}=\text{damping component}\cdot P_1/P_2+\text{proportional component}+\text{damping component for correction} \quad (5)$$

However, the damping component is $P(s+2\cdot ζ\cdot ωn)/(s^2+2\cdot ζ\cdot ωn\cdot s+ωn^2)dδ/dt$, and the proportional component is $I\cdot(s+2\cdot ζ\cdot ωn)/(s^2+2\cdot ζ\cdot ωn\cdot s+ωn^2)\cdot f(V)\cdot δ$. In addition, the damping component for correction is a damping component based on the steering angular velocity dδ/dt, and generates the steering reaction force in an opposite direction to the steering angular velocity dδ/dt.

Figure 7:
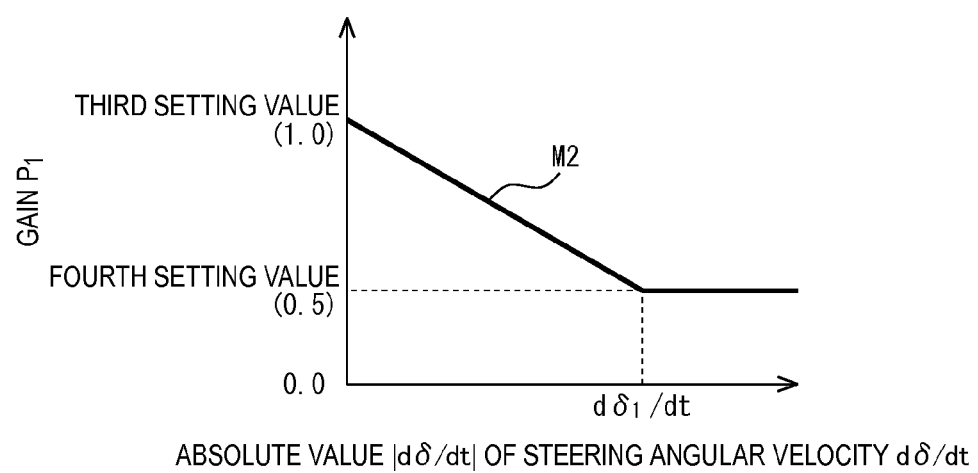
FIG. 7 is a graph representing a control map M2.

FIG. 7 is a graph representing a control map M2. Here, as a method of setting a gain $P_1$, for example, a method of reading the gain $P_1$ corresponding to the absolute value of the steering angular velocity dδ/dt from the control map M2 can be used. As the control map M2, a map in which the gains $P_1$ corresponding to the absolute values of the steering angular velocity dδ/dt are registered is given as an example. To be specific, as illustrated in FIG. 7, in the control map M2, when the steering angular velocity dδ/dt is 0, the gain $P_1$ is set to a third setting value (for example, 1.0). In addition, in a range where the absolute value of the steering angular velocity dδ/dt is equal to or larger than a first setting steering angular velocity $dδ_1/dt$, the gain $P_1$ is set to a fourth setting value (<the third setting value, for example, 0.5) regardless of the magnitude of the steering angular velocity dδ/dt. Further, in the control map M2, in a range where the absolute value of the steering angular velocity dδ/dt is equal to or larger than 0 and smaller than the first setting steering angular velocity $dδ_1/dt$, the gain $P_1$ is linearly decreased according to the absolute value of the steering angular velocity $d\delta/dt$. To be specific, in the control map M2, in the range where the absolute value of the steering angular velocity $d\delta/dt$ is equal to or larger than 0 and smaller than the first setting steering angular velocity $d\delta_1/dt$, the gain $P_1$ is set in accordance with a linear function representing a relationship between the absolute value of the steering angular velocity $d\delta/dt$ and the gain $P_1$. In the linear function, the gain $P_1$ is set to the third setting value (1.0) when the steering angular velocity $d\delta/dt$ is 0, whereas the gain $P_1$ is set to a fourth setting value (0.5) when the absolute value of the steering angular velocity $d\delta/dt$ is the first setting steering angular velocity $d\delta_1/dt$. Accordingly, the feedforward axial force calculating unit 11Ba makes smaller (corrects) the absolute value of a damping component, as the absolute value of the steering angular velocity $d\delta/dt$ is larger, when the absolute value of the steering angular velocity $d\delta/dt$ is smaller than the first setting steering angular velocity $d\delta_1/dt$. Further, the feedforward axial force calculating unit 11Ba does not correct the absolute value of the damping component based on the gain $P_1$ regardless of the magnitude of the steering angular velocity $d\delta/dt$, when the absolute value of the steering angular velocity $d\delta/dt$ is equal to or larger than the first setting steering angular velocity $d\delta_1/dt$.

Figure 8:
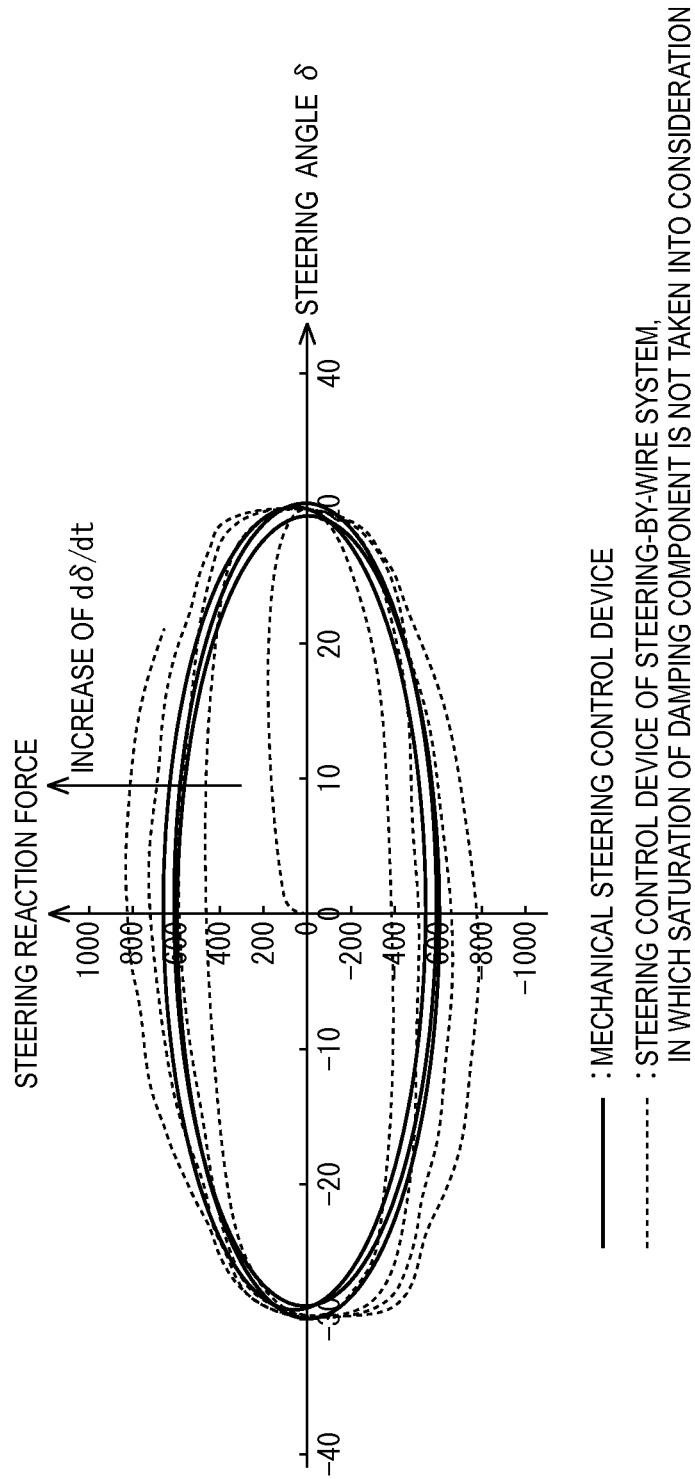
FIG. 8 is a graph representing a relationship between a steering angle δ and a steering reaction force.

FIG. 8 is a graph representing a relationship between the steering angle $\delta$ and the steering reaction force. This graph represents every steering control device (each of a steering control device of mechanical system in which the steering wheel 1 and the steered wheels 2 are mechanically coupled and a steering control device of Steer By Wire system in which the saturation of the damping component is not considered). In the steering control device of mechanical system, as an increase in the steering angular velocity $d\delta/dt$, the damping component included in the steering reaction force is saturated. Accordingly, in the steering control device of mechanical system, as illustrated in FIG. 8, in the saturation of the damping component, the shape of Lissajous's figure including the steering angle $\delta$ and the steering reaction force becomes constant regardless of the magnitude of the steering angular velocity $d\delta/dt$. However, in the steering control device of Steer By Wire system in which the saturation of the damping component included in the steering reaction force is not considered, the steering reaction force continues increasing according to an increase in the steering angular velocity $d\delta/dt$. In contrast, the control computing unit 11 in one embodiment of the represent disclosure makes smaller the absolute value of the damping component, as the absolute value of the steering angular velocity $d\delta/dt$ is larger. Therefore, the control computing unit 11 in one embodiment of the represent disclosure is capable of suppressing an increase in the absolute value of the damping component, when the steering angular velocity $d\delta/dt$ is large. Therefore, the control computing unit 11 in one embodiment of the represent disclosure is capable of suppressing an excessive damping component. Accordingly, the control computing unit 11 in one embodiment of the represent disclosure is capable of giving a more appropriate steering feeling.

Figure 9:
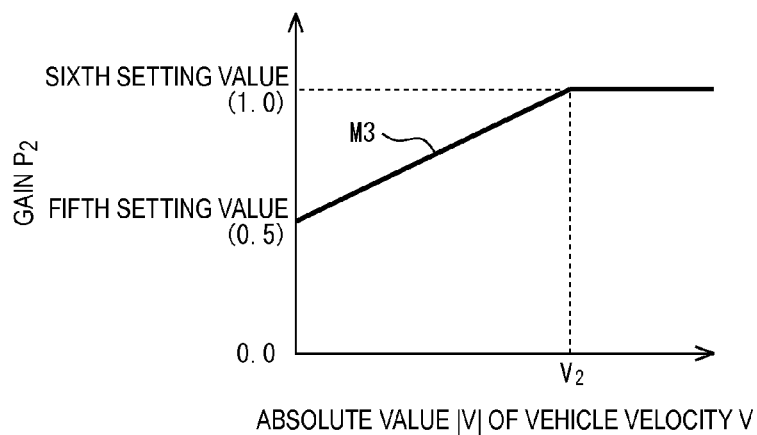
FIG. 9 is a graph representing a control map M3.

FIG. 9 is a graph representing a control map M3. In addition, as a method of setting a gain $P_2$, for example, a method of reading the gain $P_2$ corresponding to the absolute value of the vehicle velocity V from the control map M3 can be used. As the control map M3, a map in which the gains $P_2$ corresponding to the absolute values of the vehicle velocity V are registered is given as an example. To be specific, as illustrated in FIG. 9, in the control map M3, when the absolute value of the vehicle velocity V is 0, the gain $P_2$ is set to a fifth setting value (for example, 0.5). Further, in a range where the absolute value of the vehicle velocity V is equal to or larger than the second setting vehicle velocity $V_2$ (>0), the gain $P_2$ is set to a sixth setting value (>the fifth setting value. For example, 1.0) regardless of the magnitude of vehicle velocity V. Furthermore, in the control map M3, in a range where the absolute value of the vehicle velocity V is equal to or larger than 0 and smaller than the second setting vehicle velocity $V_2$, the gain $P_2$ is linearly increased according to the absolute value of the vehicle velocity V. To be specific, in the control map M3, in the range where the absolute value of the vehicle velocity V is equal to or larger than 0 and smaller than the second setting vehicle velocity $V_2$, the gain $P_2$ is set in accordance with a linear function representing a relationship between the absolute value of the vehicle velocity V and the gain $P_2$. In the linear function, when the absolute value of the vehicle velocity V is 0, the gain $P_2$ is set to a fifth setting value (0.5), and when the absolute value of the vehicle velocity V is the second setting vehicle velocity $V_2$, the gain $P_2$ is set to a sixth setting value (1.0). Accordingly, the feedforward axial force calculating unit 11Ba makes smaller (corrects) the absolute value of the damping component, as the absolute value of vehicle velocity V is smaller, when the absolute value of the vehicle velocity V is smaller than the second setting vehicle velocity $V_2$. Furthermore, the feedforward axial force calculating unit 11Ba does not correct the absolute value of the damping component based on the gain $P_2$ regardless of the magnitude of the vehicle velocity V, when the absolute value of the vehicle velocity V is equal to or larger than the second setting vehicle velocity $V_2$.

As described above, the control computing unit 11 in one embodiment of the represent disclosure makes smaller the absolute value of the damping component, as the absolute value of the vehicle velocity V is smaller. Herein, in the steering control device of mechanical system in which the steering wheel 1 and the steered wheels are mechanically coupled with each other, when the vehicle velocity V decreases, the tire lateral force Fd of the steered wheels 2 decreases and the steering reaction force decreases. In contrast, the control computing unit 11 in one embodiment of the represent disclosure makes smaller the absolute value of the damping component, as the absolute value of the vehicle velocity V is smaller, the steering reaction force can be decreased. Accordingly, the control computing unit 11 in one embodiment of the present disclosure is capable of giving a more appropriate steering feeling.

Figure 10:
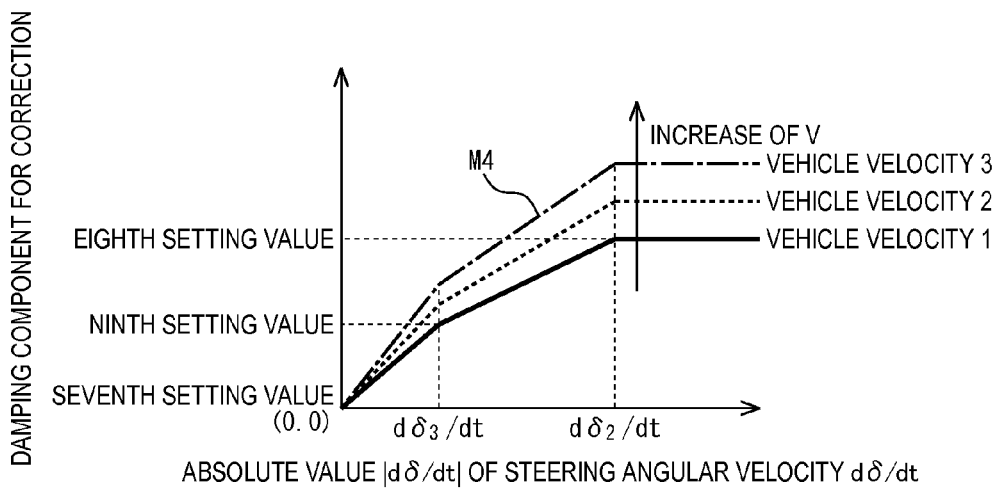
FIG. 10 is a graph representing a control map M4.

FIG. 10 is a graph representing a control map M4. As a method of setting the damping component for correction, for example, a method of reading the damping component for correction corresponding to the absolute value of the steering angular velocity $d\delta/dt$ from the control map M4 can be used. As the control map M2, a map in which the damping components for correction corresponding to the absolute values of the steering angular velocity $d\delta/dt$ are registered is given as an example. To be specific, as illustrated in FIG. 10, the control map M4 is set for every vehicle velocity V. In each control map M4, when the steering angular velocity $d\delta/dt$ is 0, the damping component for correction is set to a seventh setting value (for example, 0.0). In addition, in the control map M4, in a range where the absolute value of the steering angular velocity $d\delta/dt$ is equal to or larger than the second setting steering angular velocity $d\delta_2/dt$ (>0), the damping component for correction is set to an eighth setting value (a constant value) regardless of the magnitude of the steering angular velocity $d\delta/dt$. Further, in the control map M4, in a range where the steering angular velocity $d\delta/dt$ is equal to or larger than 0.0 and the absolute value of the steering angular velocity dδ/dt is smaller than the third setting steering angular velocity $d\delta_3/dt$ ($0<d\delta_3/dt<d\delta_2/dt$), the damping component for correction is linearly increased according to the absolute value of the steering angular velocity dδ/dt. Specifically, in each control map M4, in a range where the absolute value of the steering angular velocity dδ/dt is equal to or larger than 0 and smaller than the third setting steering angular velocity dδ3/dt, the damping component for correction is set in accordance with a linear function representing a relationship between the absolute value of the steering angular velocity dδ/dt and the damping component for correction. In the linear function, when the absolute value of the steering angular velocity dδ/dt is 0, the damping component for correction is set to a seventh setting value (0.0), whereas when the absolute value of the steering angular velocity dδ/dt is the third setting steering angular velocity $d\delta_3/dt$, the damping component for correction is set to a ninth setting value (0<the ninth setting value<the eighth setting value). Furthermore, in each control map M4, in a range where the absolute value of the steering angular velocity dδ/dt is equal to or larger than the third setting steering angular velocity $d\delta_3/dt$ and smaller than the second setting steering angular velocity $d\delta_2/dt$, the damping component for correction is linearly increased according to the absolute value of the steering angular velocity dδ/dt. To be specific, in the control map M4, in a range where the absolute value of the steering angular velocity dδ/dt is equal to or larger than the third setting steering angular velocity $d\delta_3/dt$ and smaller than the second setting steering angular velocity $d\delta_2/dt$, the damping component for correction is set in accordance with a linear function representing a relationship between the absolute value of the vehicle velocity V and the damping component for correction.

In the linear function, when the absolute value of the steering angular velocity dδ/dt is the third setting steering angular velocity $d\delta_3/dt$, the damping component for correction is set to a ninth setting value, whereas when the absolute value of the steering angular velocity dδ/dt is the second setting steering angular velocity $d\delta_2/dt$, the damping component for correction is set to an eighth setting value. Accordingly, the feedforward axial force calculating unit 11Ba makes larger the absolute value of the damping component for correction, as the absolute value of the steering angular velocity dδ/dt is larger, when the absolute value of the steering angular velocity dδ/dt is smaller than the second setting steering angular velocity $d\delta_2/dt$. In addition, the feedforward axial force calculating unit 11Ba sets the absolute value of the damping component for correction to a constant value regardless of the magnitude of the steering angular velocity dδ/dt, when the absolute value of the steering angular velocity dδ/dt is equal to or larger than the second setting steering angular velocity $d\delta_2/dt$.

As described above, the control computing unit 11 in one embodiment of the present disclosure adds the damping component for correction, which becomes larger as the absolute value of the steering angular velocity dδ/dt is larger, to the feedforward axial force $T_{FF}$. Accordingly, the control computing unit 11 in one embodiment of the present disclosure is capable of increasing the start up of the steering reaction force, when the absolute value of the steering angular velocity dδ/dt increases in the beginning of turning the steering wheel 1. Accordingly, the control computing unit 11 in one embodiment of the present disclosure is capable of giving a more appropriate steering feeling.

Further, the control computing unit 11 in one embodiment of the present disclosure sets a predefined constant value to the damping component for correction, when the absolute value of the steering angular velocity dδ/dt is equal to or larger than the second setting steering angular velocity $d\delta_2/dt$. Therefore, when a driver turns the steering wheel 1 and the absolute value of the steering angular velocity dδ/dt is equal to or larger than the second setting steering angular velocity $d\delta_2/dt$, it is possible to suppress the damping component for correction. Thus, the control computing unit 11 in one embodiment of the present disclosure is capable of preventing a change in the steering reaction force caused by a change in the damping component for correction from not being sensed, thus leading to a strange steering feeling to be given to a driver.

Figure 11:
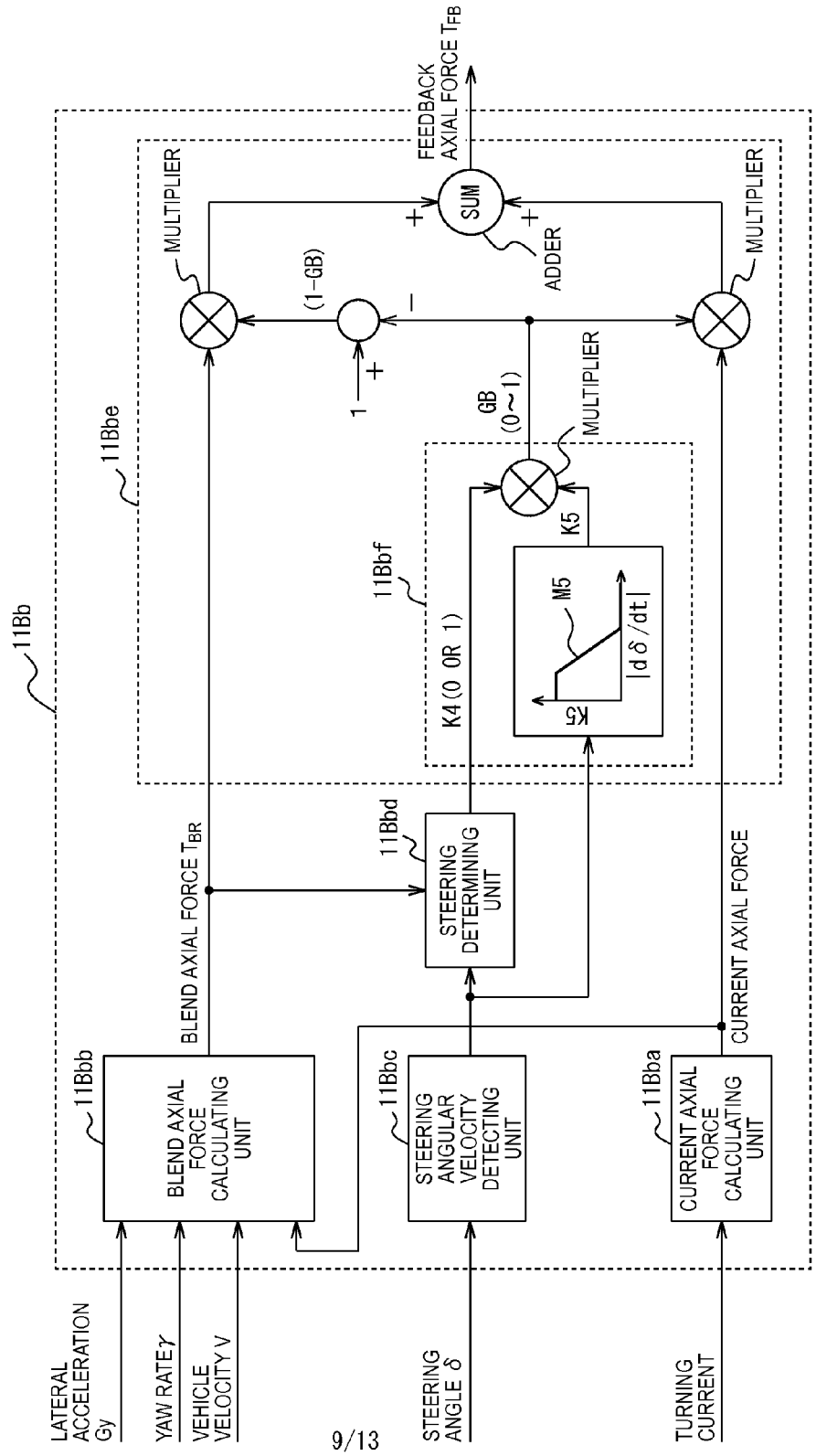
FIG. 11 is a block diagram illustrative of a configuration of a feedback axial force calculating unit 11Bb.

FIG. 11 is a block diagram illustrative of a configuration of the feedback axial force calculating unit 11Bb. As illustrated in FIG. 11, the feedback axial force calculating unit 11Bb is configured to include a current axial force calculating unit 11Bba, a blend axial force calculating unit 11Bbb, a steering angular velocity detecting unit 11Bbc, a steering determining unit 11Bbd, and a feedback axial force calculation executing unit 11Bbe.

The current axial force calculating unit 11Bba is configure to calculate a steering rack axial force (an axial force of the steering rack, hereinafter, also referred to as electric current axial force) according to the following expression (6) based on the turning electric current detected by the turning current detecting unit 8B. In the following expression (6), firstly, a turning electric current, a torque constant [Nm/A] for calculating output torque of the turning motor 8A based on the turning electric current, and a motor gear ratio for transmitting the motor torque of the turning motor 8A are multiplied. Subsequently, in the following expression (6), a multiplication result is divided by a pinion radius [m] of the pinion gear of the turning motor 8A, a division result is multiplied by the efficiency when the output torque of the turning motor 8A is transmitted, and a multiplication result is calculated as the electric current axial force. Then, the current axial force calculating unit 11Bba outputs a calculation result to the blend axial force calculating unit 11Bbb and the feedback axial force calculation executing unit 11Bbe.

The electric current axial force=(the turning electric current×the motor gear ratio×the torque constant [Nm/A]/the pinion radius [$m$])×efficiency (6)

Figure 12:
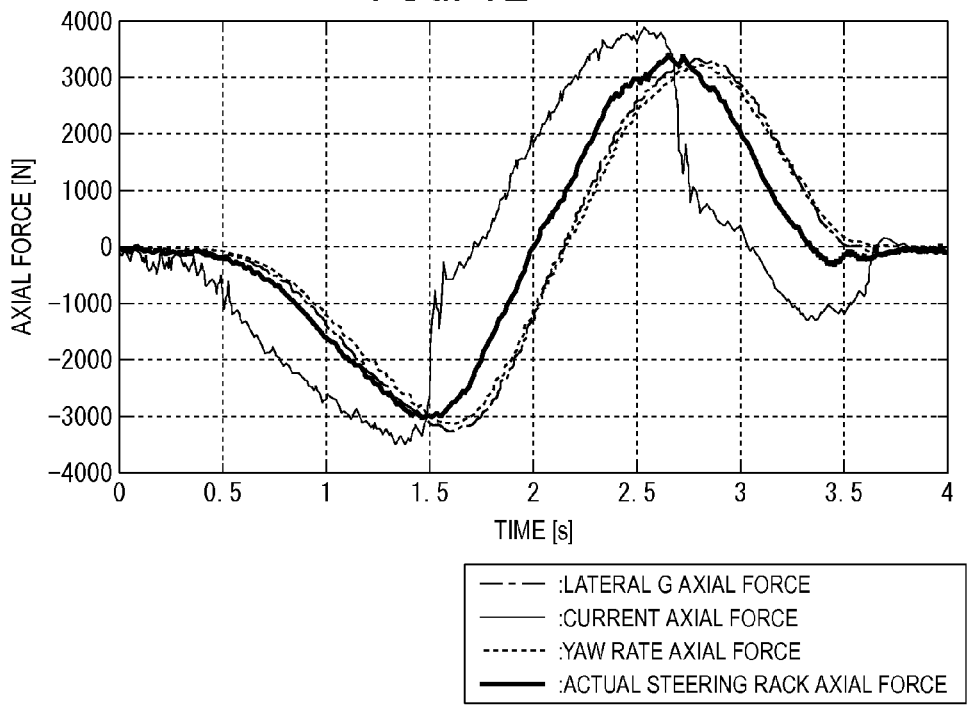
FIG. 12 is a graph representing a lateral G axial force, an electric current axial force, a yaw rate axial force, and an actual steering rack axial force.

Herein, the turning electric current fluctuates, when the steering wheel 1 is steered, the target turning angle θ* fluctuates, and a difference is made between the target turning angle θ* and an actual turning angle θ. In addition, the turning electric current also fluctuates, when the steered wheels 2 is turned, the tire lateral force Fd is applied on the steered wheels 2, and a difference is made between the target turning angle θ* and the actual turning angle θ. Further, the turning electric current also fluctuates, when a road surface disturbance works on the steered wheels 2 by unevenness or the like of the road surface, the tire lateral force Fd is applied on the steered wheels 2, and a difference is made between the target turning angle θ* and the actual turning angle θ. Therefore, the feedback axial force calculating unit 11Bb is capable of calculating the steering rack axial force (an electric current axial force), on which an influence of the tire lateral force Fd to be applied on the steered wheels 2 is reflected, based on the turning electric current. Herein, the electric current axial force is generated at the time when a difference is made between the target turning angle θ* and the actual turning angle θ. For this reason, a phase advances in the electric current axial force, as compared to the actual steering rack axial force or the lateral G axial force, as illustrated in FIG. 12.

The blend axial force calculating unit 11Bbb calculates a steering rack axial force (hereinafter, also referred to as lateral G axial force) according to the following expression (7) based on a lateral acceleration Gy detected by the lateral G sensor 6. In the following expression (7), firstly, a front wheel load and the lateral acceleration Gy are multiplied, and a multiplication result is calculated as an axial force (a force in an axial direction) applied to the steered wheels 2. Subsequently, in the following expression (7), such a calculated axial force to be applied to the steered wheels 2 and a constant number (hereinafter, also referred to as link ratio) according to an angle of link or suspension are multiplied, and a multiplication result is calculated as the lateral G axial force.

The lateral $G$ axial force=the axial force applied to the steered wheels 2×link ratio (7).

The axial force applied on the steered wheels 2=the front wheel load×the lateral acceleration Gy.

Here, the lateral acceleration Gy is generated when the steered wheels 2 is turned, the tire lateral force Fd is applied on the steered wheels 2, and the vehicle A makes turning. Accordingly, the blend axial force calculating unit 11Bbb is capable of calculating the steering rack axial force (the lateral G axial force) on which an influence of the tire lateral force Fd to be applied on the steered wheels 2 is reflected, based on the lateral acceleration Gy. Herein, since the lateral G sensor 6 is arranged on a spring (a vehicle body), the detection of the lateral acceleration Gy is delayed. Therefore, as illustrated in FIG. 12, a phase is delayed in the lateral G axial force, as compared to the actual steering rack axial force.

It is to be noted that in one embodiment of the present disclosure, an example of using the lateral acceleration Gy detected by the lateral G sensor 6, when the lateral G axial force is calculated, has been described. However, another configuration may be used. For example, a configuration in which the yaw rate γ detected by the yaw rate sensor 7 is multiplied by the vehicle velocity V detected by the vehicle velocity sensor 5, and a multiplication result γ×V is used instead of the lateral acceleration Gy may be used.

In addition, the blend axial force calculating unit 11Bbb calculates the steering rack axial force (hereinafter, also referred to as yaw rate axial force) according to the expression (8) based on the vehicle velocity V detected by the vehicle velocity sensor 5 and the yaw rate γ detected by the yaw rate sensor 7. In the following expression (8), firstly, the front wheel load, the vehicle velocity V, and the yaw rate γ are multiplied, and a multiplication result is calculated as the axial force applied on the steered wheels 2. Subsequently, in the following expression (8), such a calculated axial force to be applied on the steered wheels 2 and the link ratio are multiplied, and a multiplication result is calculated as the yaw rate axial force.

The yaw rate axial force=the axial force applied on the steered wheels 2×link ratio (8)

The axial force applied on the steered wheels 2=the front wheel load×the vehicle velocity V×the yaw rate γ.

Here, the yaw rate γ is generated when the steered wheels 2 is turned, the tire lateral force Fd is applied on the steered wheels 2, and the vehicle A makes turning. Thus, the blend axial force calculating unit 11Bbb is capable of calculating the steering rack axial force (the yaw rate axial force) on which an influence of the tire lateral force Fd to be applied on the steered wheels 2 is reflected, based on the yaw rate γ. Here, since the yaw rate sensor 7 is arranged on a spring (a vehicle body), the detection of the yaw rate γ is delayed. Hence, in the yaw rate axial force, as illustrated in FIG. 12, a phase is delayed as compared to the actual steering rack axial force.

Further, the blend axial force calculating unit 11Bbb reads the electric current axial force from the current axial force calculating unit 11Bba. Then, the blend axial force calculating unit 11Bbb calculates the steering rack axial force (hereinafter, also referred to as "blend axial force") $T_{BR}$ according to the following expression (9) based on the electric current axial force that has been read, the lateral G axial force that has been calculated, and the yaw rate axial force. In the following expression (9), the lateral G axial force is multiplied by an allocation ratio K1, the electric current axial force is multiplied by an allocation ratio K2, the yaw rate axial force is multiplied by an allocation ratio K3, and a sum of these multiplication results is calculated as the blend axial force $T_{BR}$. In other words, the blend axial force $T_{BR}$ is calculated based on the value obtained by multiplying the lateral G axial force by the allocation ratio K1, the value obtained by multiplying the electric current axial force by the allocation ratio K2, and the value obtained by multiplying the yaw rate axial force by the allocation ratio K3. Then, the blend axial force calculating unit 11Bbb outputs the calculation result to the steering determining unit 11Bbd and the feedback axial force calculation executing unit 11Bbe. Here, the blend axial force $T_{BR}$ takes a positive value for an axial force to turn the steered wheels 2 to the right, and has a negative value for the axial force to turn the steered wheels 2 to the left.

$T_{BR}$=the lateral $G$ axial force×$K1$+the electric current axial force×$K2$+the yaw rate axial force×$K3$ (9)

Here, the allocation ratios K1, K2, and K3 are allocation ratios of the lateral G axial force, the electric current axial force, and the yaw rate axial force. The magnitude relationship among the allocation ratios K1, K2, and K3 is configured to satisfy K1>K2>K3. In other words, the allocation ratios are set in descending order of the lateral G axial force, the electric current axial force, and the yaw rate axial force. For example, the allocation ratios K1, K2, and K3 are respectively set such that K1=0.6, K2=0.3, and K3=0.1. Hence, the blend axial force calculating unit 11Bbb calculates the steering rack axial force on which an influence of the tire lateral force Fd to be applied on the steered wheels 2 is reflected, as the blend axial force $T_{BR}$.

Figure 13:
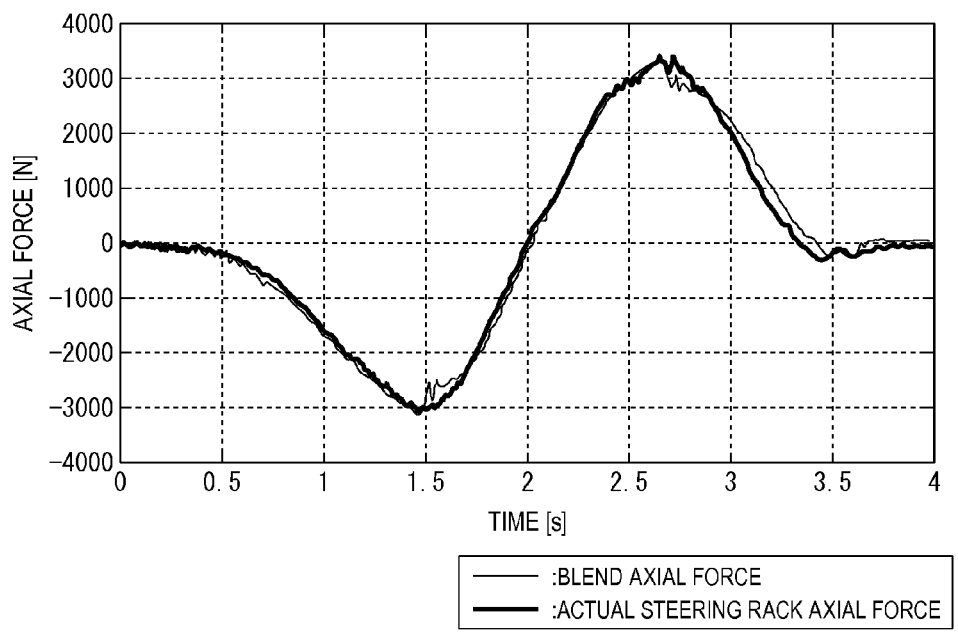
FIG. 13 is a graph representing a blend axial force $T_{BR}$ and the actual steering rack axial force.

FIG. 13 is a graph presenting the blend axial force $T_{BR}$ and the actual steering rack axial force. Thus, the blend axial force calculating unit 11Bbb in one embodiment of the present disclosure calculates the blend axial force $T_{BR}$ based on a value obtained by multiplying the electric current axial force by the allocation ratio K2 and a value obtained by multiplying the lateral G axial force by the allocation ratio K1. Here, as illustrated in FIG. 12, a phase is delayed in the lateral G axial force, as compared to the actual steering rack axial force. Also, a phase advances in the electric current axial force, as compared to the actual steering rack axial force. Accordingly, the blend axial force calculating unit 11Bbb in one embodiment of the present disclosure adds the electric current axial force to the lateral G axial force, so that the delay in the phase made by the lateral G axial force can be compensated, as illustrated in FIG. 13, and a more appropriate blend axial force $T_{BR}$ can be calculated. Therefore, the control computing unit 11 in one embodiment of the present disclosure drives the reaction force motor 9A based on the blend axial force $T_{BR}$, so that a more appropriate steering reaction force can be applied.

In addition, the blend axial force calculating unit 11Bbb in one embodiment of the present disclosure calculates the blend axial force $T_{BR}$ based on a value obtained by multiplying the electric current axial force by the allocation ratio K2 and a value obtained by multiplying the lateral G axial force by the allocation ratio K1. Here, in the vehicle A, when a road surface disturbance applied on the steered wheels 2 by unevenness or the like of the road surface and the tire lateral force Fd is applied on the steered wheels 2, a difference is made between the target turning angle θ* and the actual turning angle θ. Therefore, the blend axial force calculating unit 11Bbb in one embodiment of the present disclosure adds the electric current axial force to the lateral G axial force, so that an influence of the road surface disturbance to be made on the steered wheels 2 can be reflected on the blend axial force $T_{BR}$ and a more appropriate blend axial force $T_{BR}$ can be calculated.

Therefore, the control computing unit 11 in one embodiment of the present disclosure drives the reaction force motor 9A based on the blend axial force $T_{BR}$, so that a more appropriate steering reaction force can be applied.

Further, the blend axial force calculating unit 11Bbb in one embodiment of the present disclosure makes the allocation ratio K1 of the lateral G axial force larger than the allocation ratio K2 of the electric current axial force. Hence, the blend axial force calculating unit 11Bbb in one embodiment of the present disclosure is capable of reducing the allocation ratio of the electric current axial force, and even if an estimated accuracy of the electric current axial force degrades by an influence of inertia or friction of the turning motor 8A, such a degradation in the estimated accuracy of the blend axial force $T_{BR}$ can be suppressed. Therefore, the control computing unit 11 in one embodiment of the present disclosure drives the reaction force motor 9A based on the blend axial force $T_{BR}$, so that a more appropriate steering reaction force can be applied.

In addition, the blend axial force calculating unit 11Bbb in one embodiment of the present disclosure calculates the feedback axial force $T_{FB}$ based on a value obtained by multiplying the electric current axial force by the allocation ratio K2, a value obtained by multiplying the lateral G axial force by the allocation ratio K1, and a value obtained by multiplying the yaw rate axial force by the allocation ratio K3. Here, for example, when the vehicle A falls in a spin state, the turning electric current and the lateral acceleration Gy increase. Hence, the detection result of the lateral G sensor 6 and the detection result of the turning current detecting unit 8B both take maximum values (saturation values). In contrast, although the yaw rate γ also increases, an increased amount of the yaw rate γ is smaller than increased amounts of the turning electric current and the lateral acceleration Gy. Therefore, the detection result of the yaw rate sensor 7 does not reach the maximum value (saturation value). Therefore, the detection result of the yaw rate sensor 7 changes depending on the degree of the spin state of the vehicle A. Accordingly, the blend axial force $T_{BR}$ can be changed depending on the degree of the spin state of vehicle A. As a result, the control computing unit 11 in one embodiment of the present disclosure drives the reaction force motor 9A based on the blend axial force $T_{BR}$, so that a more appropriate steering reaction force can be applied.

The steering angular velocity detecting unit 11Bbc calculates the steering angular velocity dδ/dt of the steering wheel 1 based on the steering angle δ detected by the steering angle sensor 3. Then, the steering angular velocity detecting unit 11Bbc outputs a calculation result to the blend axial force calculating unit 11Bbb and the steering determining unit 11Bbd. Here, the steering angular velocity dδ/dt is set to take a positive value of the angular velocity when the steering wheel 1 rotates clockwise, and takes a negative value of the angular velocity when the steering wheel 1 rotates counterclockwise.

The steering determining unit 11Bbd determines which the driver is further turning the steering wheel 1 or returning the steering wheel 1 based on the blend axial force $T_{BR}$ calculated by the blend axial force calculating unit 11Bbb and the steering angular velocity dδ/dt detected by the steering angular velocity detecting unit 11Bbc. As the further turning operation, for example, the steering wheel 1 (the steering angle δ) is operated to the direction apart from the neutral position. Also, as the returning operation, for example, the steering wheel 1 (the steering angle δ) is operated to the direction closer to the neutral position. To be specific, the steering determining unit 11Bbd determines that the further turning operation is being made and sets a variable K4 to 1.0, when the blend axial force $T_{BR}$ is a positive value and the steering angular velocity dδ/dt is a positive value, or when the blend axial force $T_{BR}$ is a negative value and the steering angular velocity dδ/dt is a negative value. The variable K4 is a flag representing which the further turning operation or the returning operation is being made. The variable K4 is set such that when the further turning operation of the steering wheel 1 is being made, the variable K4 is set to 1.0, whereas when the returning operation is being made, the variable K4 is set to 0.0. Further, the steering determining unit 11Bbd determines that the further turning operation of the steering wheel 1 is not being made and sets the variable K4 to 0, when the blend axial force $T_{BR}$ is a positive value and the steering angular velocity dδ/dt is a negative value, or when the blend axial force $T_{BR}$ is a negative value and the steering angular velocity dδ/dt is a positive value. Then, the steering determining unit 11Bbd outputs the variable K4 that has been set to the feedback axial force calculation executing unit 11Bbe.

The feedback axial force calculation executing unit 11Bbe reads the electric current axial force, the blend axial force $T_{BR}$, the steering angular velocity dδ/dt, and the variable K4, from the current axial force calculating unit 11Bba, the blend axial force calculating unit 11Bbb, the steering angular velocity detecting unit 11Bbc and the steering determining unit 11Bbd, respectively. Subsequently, the feedback axial force calculation executing unit 11Bbe calculates the steering rack axial force (hereinafter, feedback axial force $T_{FB}$) according to the following expression (10) based on the electric current axial force, the blend axial force $T_{BR}$, the steering angular velocity dδ/dt, and the variable K4 that have been read. Then, the feedback axial force calculation executing unit 11Bbe outputs a calculation result to the feedback axial force correcting unit 11Bf.

The feedback axial force $T_{FB}$=the electric current axial force×GB+the blend axial force $T_{BR}$×(1−GB) \hfill (10)

However, GB is a numeric value representing an allocation ratio GB of the electric current axial force and an allocation ratio (1−GB) of the blend axial force $T_{BR}$ (hereinafter, referred to as allocation ratio). Accordingly, the feedback axial force calculation executing unit 11Bbe calculates the feedback axial force $T_{FB}$ by adding the electric current axial force and the blend axial force $T_{BR}$ at a ratio of GB:(1−GB) based on the allocation ratio GB.

Here, as a method of setting the allocation ratio GB, for example, a method of setting the allocation ratio GB by an allocation ratio setting unit 11Bbf based on a determination result output from the steering determining unit 11Bbd can be used. The allocation ratio setting unit 11Bbf reads the steering angular velocity dδ/dt and the variable K4 from the steering determining unit 11Bbd. Subsequently, the allocation ratio setting unit 11Bbf calculates the allocation ratio GB according to the following expression (11) based on the steering angular velocity dδ/dt and the variable K4 that have been read.

$$GB = K4 \times K5 \qquad (11)$$

However, K5 is a numeric value representing the allocation ratio GB of the electric current axial force and the allocation ratio (1−GB) of the blend axial force $T_{BR}$, when K4 is 1.0, that is in the further turning operation of the steering wheel 1. Accordingly, the feedback axial force calculation executing unit 11Bbe adds the electric current axial force and the blend axial force $T_{BR}$ based on the variable K5 at a ratio of K5:(1−K5), in the further turning operation of the steering wheel 1, to calculate the feedback axial force $T_{FB}$. It is to be noted that when K4 is 0.0, that is, in the returning operation of the steering wheel 1, the blend axial force $T_{BR}$ is set to the feedback axial force $T_{FB}$ regardless of the variable K5.

Here, as a method of setting the variable K5, for example, a method of reading the variable K5 corresponding to the steering angular velocity dδ/dt from the control map M5 can be used. As the control map M5, a map in which the variables K5 corresponding to the steering angular velocities dδ/dt are registered is given as an example.

Figure 14:
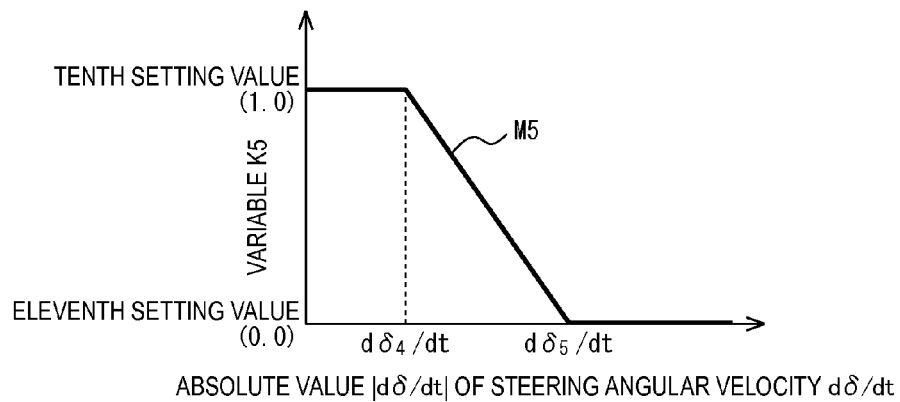
FIG. 14 is a graph representing a control map M5.

FIG. 14 is a graph representing a control map M5. As illustrated in FIG. 14, in the control map M5, in a range where the absolute value of the steering angular velocity dδ/dt is equal to or larger than 0 and smaller than the fourth setting steering angular velocity $d\delta_4/dt$ (>0), the variable K5 is set to a tenth setting value (for example, 1.0) regardless of the magnitude of the steering angular velocity dδ/dt. Also, in the control map M5, in a range where the absolute value of the steering angular velocity dδ/dt is equal to or larger than the fifth setting steering angular velocity $d\delta_5/dt$ (>$d\delta_4/dt$), the variable K5 is set to an eleventh setting value (<the tenth setting value. For example, 0.0) regardless of the magnitude of the steering angular velocity dδ/dt. Further, in the control map M5, in a range where the absolute value of the steering angular velocity dδ/dt is equal to or larger than the fourth setting steering angular velocity $d\delta_4/dt$ and smaller than the fifth setting steering angular velocity $d\delta_5/dt$, the variable K5 is linearly decreased according to the absolute value of the steering angular velocity dδ/dt. To be specific, in the control map M5, in the range where the absolute value of the steering angular velocity dδ/dt is equal to or larger than the fourth setting steering angular velocity $d\delta_4/dt$ and smaller than the fifth setting steering angular velocity $d\delta_5/dt$, the variable K5 is set in accordance with a linear function representing a relationship between the absolute value of the steering angular velocity dδ/dt and the variable KS. In the linear function, in a case where the absolute value of the steering angular velocity dδ/dt is the fourth setting steering angular velocity $d\delta_4/dt$, the variable K5 is set to the tenth setting value (1.0), in a case where the absolute value of the steering angular velocity dδ/dt is the fifth setting steering angular velocity $d\delta_5/dt$, the variable K5 is set to the eleventh setting value (0.0). Accordingly, the allocation ratio setting unit 11Bbf sets the allocation ratio GB to 1.0, when the variable K4 is 1.0 (in the further turning operation), and when the absolute value of the steering angular velocity dδ/dt is smaller than the fourth setting steering angular velocity $d\delta_4/dt$ (in a low velocity steering operation). Then, the feedback axial force calculation executing unit 11Bbe sets the electric current axial force to the feedback axial force $T_{FB}$. In addition, the allocation ratio setting unit 11Bbf sets the allocation ratio GB to 0.0, in a case where the variable K4 is 1.0 is (in the further turning operation) and the absolute value of the steering angular velocity dδ/dt is larger than the fifth setting steering angular velocity $d\delta_5/dt$ (in a high velocity steering operation). Accordingly, the feedback axial force calculation executing unit 11Bbe sets the blend axial force $T_{BR}$ to the feedback axial force $T_{FB}$. Further, the allocation ratio setting unit 11Bbf sets the variable K5 to the allocation ratio GB, in a case where the variable K4 is 1.0 (in the further turning operation) and the absolute value of the steering angular velocity dδ/dt is equal to or larger than the fourth setting steering angular velocity $d\delta_4/dt$ and smaller than the fifth setting steering angular velocity $d\delta_5/dt$ (in a medium velocity steering operation). Accordingly, the feedback axial force calculation executing unit 11Bbe sets a value to the feedback axial force $T_{FB}$, the value being obtained by adding a value obtained by multiplying the electric current axial force by the variable K5 and a value obtained by multiplying the blend axial force $T_{BR}$ by (1−K5). On the other hand, the allocation ratio setting unit 11Bbf sets 0.0 to the allocation ratio GB, when the variable K4 is 0.0 (in the returning operation), regardless of the steering angular velocity dδ/dt. Then, the feedback axial force calculation executing unit 11Bbe sets the blend axial force $T_{BR}$ to the feedback axial force $T_{FB}$.

In this manner, when the returning operation of the steering wheel 1 is performed, the feedback axial force calculation executing unit 11Bbe in one embodiment of the present disclosure sets the electric current axial force to the feedback axial force $T_{FB}$, in the case where the absolute value of the fourth steering angular velocity dδ/dt is smaller than the fourth setting steering angular velocity $d\delta_4/dt$. In the mechanical type of the steering control device in which the steering wheel 1 and the steered wheels 2 are mechanically coupled with each other, the steering reaction force to return the steering wheel 1 to the neutral position is generated by the tire lateral force Fd following the turning of the steered wheels 2 and friction, in the further turning operation of the steering wheel 1. In addition, in the feedback axial force calculation executing unit 11Bbe in one embodiment of the present disclosure, the electric current axial force is equal to an added value of the tire lateral force Fd and the friction in the further turning operation of the steering wheel 1. Hence, the control computing unit 11 in one embodiment of the present disclosure sets the electric current axial force to the feedback axial force $T_{FB}$, so that the steering reaction force to return the steering wheel 1 to the neutral position can be applied, like the mechanical type of the steering control device. Accordingly, the control computing unit 11 in one embodiment of the present disclosure is capable of applying a more appropriate steering reaction force, in the further turning operation of the steering wheel 1.

By the way, a factor of the friction following the turning of the steered wheels 2 is not included in the blend axial force $T_{BR}$. Therefore, for example, if the method of setting the blend axial force $T_{BR}$ to the feedback axial force $T_{FB}$ is used in the further turning operation of the steering wheel 1, there is a possibility that the steering feeling includes an uncomfortable feeling.

In addition, when the returning operation of the steering wheel 1 is performed, the feedback axial force calculation executing unit 11Bbe in one embodiment of the present disclosure sets the blend axial force $T_{BR}$ in which the electric current axial force and the lateral G axial force are allocated at a predefined allocation ratio to the feedback axial force $T_{FB}$, regardless of the magnitude of the absolute value of the steering angular velocity dδ/dt. Here, in the mechanical type of the steering control device in which the steering wheel 1 and the steered wheels 2 are mechanically coupled with each other, in the returning operation of the steering wheel 1, a steering reaction force to return the steering wheel 1 to the neutral position is generated by the tire lateral force Fd following the turning of the steered wheels 2. Thus, in the mechanical type of the steering control device, in the returning operation of the steering wheel 1, the driver reduces the holding power of holding the steering wheel 1 and slides over the steering wheel 1 with a palm of a hand to return the steering wheel 1 to the neutral position and return the steered wheels 2 to the neutral position. In contrast, according to the feedback axial force calculation executing unit 11Bbe in one embodiment of the present disclosure, the blend axial force $T_{BR}$ is set to the feedback axial force $T_{FB}$. Therefore, even if the turning electric current decreases and the electric current axial force decreases, it is possible to suppress the steering reaction force to return the steering wheel 1 to the neutral position. Accordingly, the feedback axial force calculation executing unit 11Bbe in one embodiment of the present disclosure returns the steering wheel 1 to the neutral position, like the mechanical type of the steering control device, when the driver reduces the holding power of holding the steering wheel 1 and slides over the steering wheel 1 with a palm of a hand. Accordingly, the control computing unit 11 in one embodiment of the present disclosure is capable of applying a more appropriate steering reaction force in the returning operation of the steering wheel 1.

Further, when it is determined that the further returning operation of the steering wheel 1 is performed, and the absolute value of the steering angular velocity dδ/dt is equal to or larger than the fourth setting steering angular velocity $dδ_4/dt$, the feedback axial force calculation executing unit 11Bbe in one embodiment of the present disclosure blends the electric current axial force and the blend axial force $T_{BR}$ to set the feedback axial force $T_{FB}$, and in addition, to make larger the allocation ratio of the electric current axial force, as the absolute value of the steering angular velocity dδ/dt is smaller. Accordingly, for example, when the steering angle δ moves over the neutral position and the further returning operation of the steering wheel 1 is continuously made, in the returning operation of the steering wheel 1, the feedback axial force calculation executing unit 11Bbe in one embodiment of the present disclosure is capable of gradually shifting the feedback axial force $T_{FB}$ from the blend axial force $T_{BR}$ to the electric current axial force, as the absolute value of the steering angular velocity dδ/dt gradually decreases in the further returning operation. Accordingly, the control computing unit 11 in one embodiment of the present disclosure is capable of applying a more appropriate steering reaction force.

Returning to FIG. 3, the final axial force calculating unit 11Bc reads the steering angle δ, the vehicle velocity V, the lateral acceleration Gy, the feedforward axial force $T_{FF}$, and the feedback axial force $T_{FB}$, from the steering angle sensor 3, the vehicle velocity sensor 5, the lateral G sensor 6, the feedforward axial force calculating unit 11Ba, and the feedback axial force correcting unit 11Bf, respectively. Subsequently, the final axial force calculating unit 11Bc calculates the steering angular velocity dδ/dt of the steering wheel 1 based on the steering angle δ that has been read. Then, the final axial force calculating unit 11Bc calculates the steering rack axial force (hereinafter, referred to as final axial force) according to the following expression (12) based on the steering angle δ, the vehicle velocity V, the lateral acceleration Gy, the feedforward axial force $T_{FF}$, and the feedback axial force $T_{FB}$ that have been read, and the steering angular velocity dδ/dt that has been calculated. Then, the final axial force calculating unit 11Bc outputs a calculation result to the axial force-steering reaction force converting unit 11Bd.

The final axial force=the feedforward axial force $T_{FF} \times GF$+the feedback axial force $T_{FB} \times (1-GF)$ (12)

Here, GF is a numeric value (hereinafter, referred to as allocation ratio) to represent the allocation ratio GF of the feedforward axial force $T_{FF}$ and the allocation ratio (1−GF) of the feedback axial force $T_{FB}$. Accordingly, the final axial force calculating unit 11Bc adds the feedforward axial force $T_{FF}$ and the feedback axial force $T_{FB}$ at a ratio of GF:(1−GF) based on the allocation ratio GF so as to calculate the final axial force.

In this manner, the final axial force calculating unit 11Bc in one embodiment of the present disclosure calculates the final axial force based on the feedback axial force $T_{FB}$ and the feedforward axial force $T_{FF}$. Here, the feedback axial force $T_{FB}$ is changed depending on a change in the road surface or a change in the vehicle state, since an influence of the tire lateral force Fd applied on the steered wheels 2 is reflected on the feedback axial force $T_{FB}$. In contrast, since an influence of the tire lateral force Fd is not reflected on the feedforward axial force $T_{FF}$, the feedforward axial force $T_{FF}$ is smoothly changed regardless of the change or the like in the road surface. Accordingly, the final axial force calculating unit 11Bc calculates the final axial force based on not only the feedback axial force $T_{FB}$ but also the feedforward axial force $T_{FF}$, so that a more appropriate final axial force can be calculated.

The final axial force calculating unit 11Bc is configured to include an allocation ratio calculating unit 11Bca. The allocation ratio calculating unit 11Bca is configured to set the allocation ratio GF based on the lend ratio $GF_1$ based on an axial force difference, the allocation ratio $GF_2$ based on the lateral acceleration Gy, the allocation ratio $GF_3$ based on the vehicle velocity V and the steering angle δ, and the allocation ratio $GF_4$ based on the steering angular velocity dδ/dt. As the axial force difference, for example, a difference between the feedforward axial force $T_{FF}$ and the feedback axial force $T_{FB}$ can be used. To be specific, the axial force difference is a subtraction result obtained by subtracting the feedback axial force $T_{FB}$ from the feedforward axial force $T_{FF}$. In addition, as a method of setting the allocation ratio GF, for example, a method of multiplying a smaller value of either the allocation ratio $GF_1$ based on the axial force difference or the allocation ratio $GF_2$ based on and the lateral acceleration Gy, the allocation ratio $GF_3$ based on the vehicle velocity V and the steering angle δ, and the allocation ratio $GF_4$ based on the steering angular velocity dδ/dt, and then setting a multiplication result to the allocation ratio GF can be used.

Figure 15:
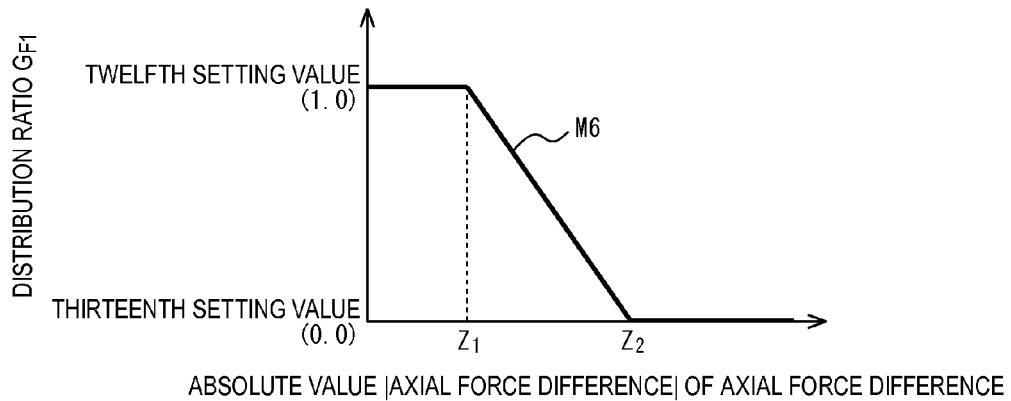
FIG. 15 is a graph representing a control map M6.

FIG. 15 is a graph representing a control map M6. As a setting method of the allocation ratio $GF_1$, for example, a method of reading the allocation ratio $GF_1$ corresponding to the absolute value of the axial force difference from the control map M6 can be used. As the control map M6, for example, there is a map in which the allocation ratios $GF_1$ corresponding to the absolute values of the axial force difference is registered. To be specific, as illustrated in FIG. 15, in the control map M6, in a range where the absolute value of the axial force difference is equal to or larger than 0 and smaller than a first setting axial force difference Z1 (>0), the allocation ratio $GF_1$ is set to a twelfth setting value (for example, 1.0) regardless of the magnitude of the axial force difference. As the first setting axial force difference Z1, for example, the axial force difference by which the estimated accuracy of the feedforward axial force $T_{FF}$ starts degrading can be used. Also, in the control map M6, in a range where the absolute value of the axial force difference is equal to or larger than a second setting axial force difference Z2 (>Z1), for example, the allocation ratio $GF_1$ is set to a thirteenth setting value (<the twelfth setting value. For example, 0.0) regardless of the magnitude of the axial force difference. As the second setting axial force difference Z2, for example, it is possible to use the axial force difference by which the estimated accuracy of the feedforward axial force $T_{FF}$ is made lower than the estimated accuracy of the feedback axial force $T_{FB}$. Further, in the control map M6, in a range where the absolute value of the axial force difference is equal to or larger than the first setting axial force difference Z1 and smaller than the second setting axial force difference Z2, the allocation ratio $GF_1$ is linearly decreased according to the absolute value of the axial force difference. To be specific, in the control map M6, in a range where the absolute value of the axial force difference is equal to or larger than the first setting axial force difference Z1 and smaller than the second setting axial force difference Z2, the allocation ratio $GF_1$ is set in accordance with a linear function to represent a relationship between the absolute value of the axial force difference and the allocation ratio $GF_1$. In the linear function, in a case where the absolute value of the axial force difference is the first setting axial force difference Z1, the allocation ratio $GF_1$ is set to the twelfth setting value (1.0), whereas in a case where the absolute value of the axial force difference is the second setting axial force difference Z2, the allocation ratio $GF_1$ is set to the thirteenth setting value (0.0).

Thus, in the case where the first absolute value of the axial force difference is equal to or larger than the first setting axial force difference Z1, the final axial force calculating unit 11Bc in one embodiment of the present disclosure makes smaller the allocation ratio $GF_1$ (the allocation ratio GF of the feedforward axial force $T_{FF}$), than that of the case where the absolute value of the axial force difference is smaller than the first setting axial force difference Z1. Thus, for example, when the road surface μ decreases, the estimated accuracy of the feedforward axial force $T_{FF}$ degrades, and the axial force difference increases, the final axial force calculating unit 11Bc in one embodiment of the present disclosure is capable of increasing the allocation ratio (1−GF) of the feedback axial force $T_{FB}$. Therefore, the final axial force calculating unit 11Bc in one embodiment of the present disclosure is capable of applying a more appropriate steering reaction force.

Figure 16:
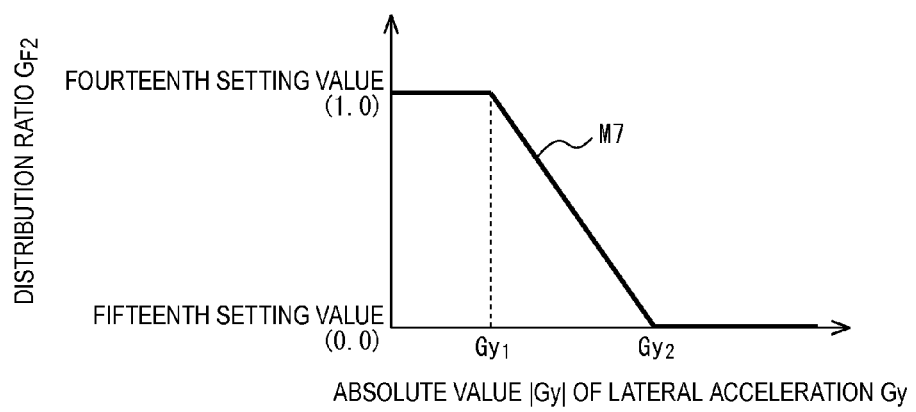
FIG. 16 is a graph representing a control map M7.

FIG. 16 is a graph representing a control map M7. Here, as a method of setting the allocation ratio $GF_2$, for example, a method of reading the allocation ratio $GF_2$ corresponding to the absolute value of the lateral acceleration Gy from the control map M7 can be used. As the control map M7, for example, there is a map in which the allocation ratios $GF_2$ corresponding to the absolute values of the lateral acceleration Gy is registered. To be specific, as illustrated in FIG. 16, in the control map M7, in a range where the absolute value of the lateral acceleration $Gy_1$ is equal to or larger than 0 and smaller than the first setting lateral acceleration $Gy_1$ (>0), the allocation ratio $GF_2$ is set to a fourteenth setting value (for example, 1.0) regardless of the magnitude of the lateral acceleration Gy. As the first setting lateral acceleration $Gy_1$, for example, the lateral acceleration Gy by which the estimated accuracy of the feedforward axial force $T_{FF}$ starts degrading can be used. In addition, in the control map M7, in a range where the absolute value of the lateral acceleration Gy is equal to or larger than the second setting lateral acceleration $Gy_2$ (>$Gy_1$), the allocation ratio $GF_2$ is set to a fifteenth setting value (<the fourteenth setting value. For example, 0.0) regardless of the magnitude of the lateral acceleration Gy. As the second setting lateral acceleration $Gy_2$, for example, the lateral acceleration Gy by which the estimated accuracy of the feedforward axial force $T_{FF}$ is made smaller than the estimated accuracy of the feedback axial force $T_{FB}$ can be used. Further, in the control map M7, in a range where the absolute value of the lateral acceleration $Gy_1$ is equal to or larger than the first lateral acceleration Gy and smaller than the second setting lateral acceleration $Gy_2$, the allocation ratio $GF_2$ is linearly decreased according to the absolute value of the lateral acceleration Gy. To be specific, in the control map M7, in the range where the absolute value of the lateral acceleration Gy is equal to or larger than the first setting lateral acceleration $Gy_1$ and smaller than the second setting lateral acceleration $Gy_2$, the allocation ratio $GF_2$ is set in accordance with a linear function representing a relationship between the absolute value of the lateral acceleration Gy and the allocation ratio $GF_2$. In the linear function, in a case where the absolute value of the lateral acceleration Gy is the first setting lateral acceleration $Gy_1$, the allocation ratio $GF_3$ is set to the fourteenth setting value (1.0), and in a case where the absolute value of the lateral acceleration Gy is the second setting lateral acceleration $Gy_2$, the allocation ratio $GF_3$ is set to the fifteenth setting value (0.0).

In this manner, in the case where the absolute value of the lateral acceleration Gy is equal to or larger than the first setting lateral acceleration $Gy_1$, the final axial force calculating unit 11Bc in one embodiment of the present disclosure makes smaller the allocation ratio $GF_2$ (the allocation ratio GF of the feedforward axial force $T_{FF}$) than that of the case where the absolute value of the lateral acceleration $Gy_1$ is smaller than the first lateral acceleration Gy. Accordingly, for example, when the lateral acceleration Gy increases and the estimated accuracy of the feedforward axial force $T_{FF}$ decreases, the final axial force calculating unit 11Bc in one embodiment of the present disclosure is capable of increasing the allocation ratio (1−GF) of the feedback axial force $T_{FB}$. Therefore, the final axial force calculating unit 11Bc in one embodiment of the present disclosure is capable of applying a more appropriate steering reaction force.

Figure 17A:
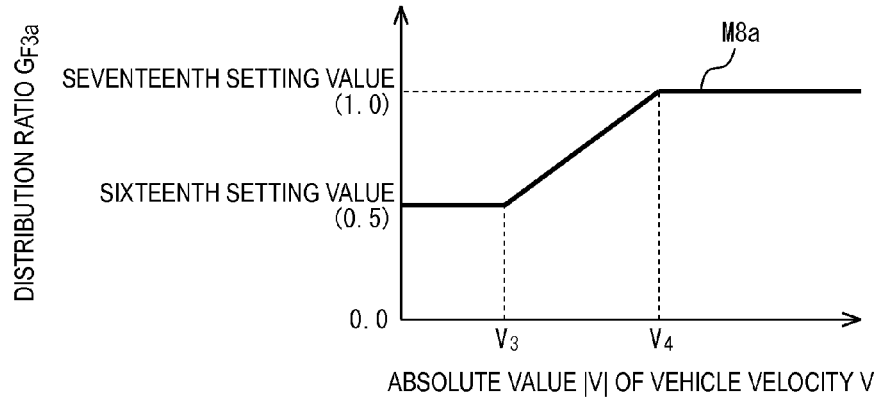
FIG. 17A and FIG. 17B are graphs representing control maps M8a and M8b.
Figure 17B:
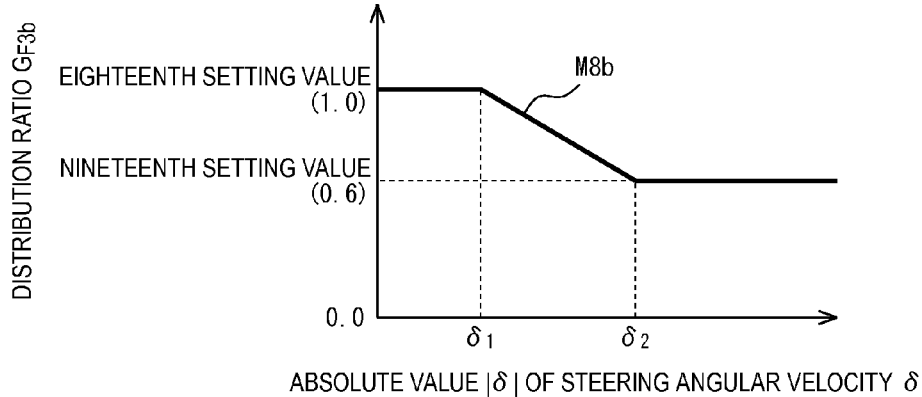

FIG. 17A and FIG. 17B are graphs representing control maps M8a and M8b. Here, as a method of setting the allocation ratio $GF_3$, for example, a method of reading allocation ratios $GF_{3a}$ and $GF_{3b}$ corresponding to the absolute value of the vehicle velocity V and the absolute value of the steering angle δ are read from the control maps M8a and M8b, multiplying the allocation ratios $GF_{3a}$ and $GF_{3b}$ that have been read, and setting a multiplication result to the allocation ratio $GF_3$ can be used. As the control map M8a, for example, there is a map in which the allocation ratios $GF_3$ corresponding to the absolute values of the vehicle velocity V is registered. To be specific, as illustrated in FIG. 17A, in the control map M8a, in a range where the absolute value of the vehicle velocity V is equal to or larger than 0 and smaller than a third setting vehicle velocity $V_3$, the allocation ratio $GF_{3a}$ is set to a sixteen setting value (for example, 0.5) regardless of the magnitude of the vehicle velocity V. As the third setting vehicle velocity $V_3$, for example, a vehicle velocity V by which non-linearity of the tire property due to a low velocity of the vehicle velocity V (non-linearity of tire lateral force Fd with respect to the tire sliding angle) appears and the estimated accuracy of the feedforward axial force $T_{FF}$ starts degrading can be used. In addition, in the control map M8a, the absolute value of the vehicle velocity V is equal to or larger than the fourth setting vehicle velocity $V_4$ (>$V_3$), the allocation ratio $GF_{3a}$ is set to a seventeenth setting value (>the sixteenth setting value. For example, 1.0) regardless of the magnitude of the vehicle velocity V. As the fourth setting vehicle velocity $V_4$, for example, the vehicle velocity V by which the estimated accuracy of the feedforward axial force $T_{FF}$ is improved more than the estimated accuracy of the feedback axial force $T_{FB}$ can be used. Further, in the control map M8a, in a range where the absolute value of the vehicle velocity V is equal to or larger than a third setting vehicle velocity $V_3$ and smaller than a fourth setting vehicle velocity $V_4$, the allocation ratio $GF_{3a}$ is linearly increased according to the absolute value of vehicle velocity V. To be specific, in the control map M8a, in a range where the absolute value of the vehicle velocity V is equal to or larger than the third setting vehicle velocity $V_3$ and smaller than the fourth setting vehicle velocity $V_4$, the allocation ratio $GF_{3a}$ is set in accordance with a linear function representing a relationship between the vehicle velocity V and the allocation ratio $GF_{3a}$. In the linear function, in a case where the absolute value of the vehicle velocity V is the third setting vehicle velocity $V_3$, the allocation ratio $GF_{3a}$ is set to the sixteenth setting value (0.5), and in a case where the vehicle velocity V is the fourth setting vehicle velocity $V_4$, the allocation ratio $GF_{3a}$ is set to the seventeenth setting value (1.0).

In this manner, in the case where the absolute value of the vehicle velocity V is smaller than the fourth setting vehicle velocity $V_4$, the final axial force calculating unit 11Bc in one embodiment of the present disclosure makes smaller the allocation ratio $GF_{3a}$ (the allocation ratio GF of the feedforward axial force $T_{FF}$) than that of the case where the absolute value of the vehicle velocity V is equal to or larger than the fourth setting vehicle velocity $V_4$. Hence, the final axial force calculating unit 11Bc in one embodiment of the present disclosure is capable of increasing the allocation ratio (1−GF) of the feedback axial force $T_{FB}$, when, for example, the vehicle velocity V decreases and the estimated accuracy of the feedforward axial force $T_{FF}$ degrades. Therefore, the final axial force calculating unit 11Bc in one embodiment of the present disclosure is capable of applying a more appropriate steering reaction force.

In addition, as the control map M8b, for example, there is a map in which the allocation ratios $GF_{3b}$ corresponding to the absolute values of the steering angle δ is registered. To be specific, as illustrated in FIG. 17B, in the control map M8b, in a range where the absolute value of the steering angle δ is equal to or larger than 0 and smaller than the first setting steering angle δ (>0), the allocation ratio $GF_{3b}$ is set to an eighteenth setting value (for example, 1.0) regardless of the magnitude of the steering angle δ. As the first setting steering angle δ1, for example, the steering angle δ by which the estimated accuracy of the feedforward axial force $T_{FF}$ starts degrading can be used. In addition, in the control map M8b, in a range where the absolute value of the steering angle δ is equal to or larger than a second setting steering angle δ (>δ1), the allocation ratio $GF_{3b}$ is set to a nineteenth setting value (<the eighteenth setting value, for example, 0.6) regardless of the magnitude of the steering angle δ.

As the second setting steering angle δ2, for example, the steering angle δ by which the estimated accuracy of the feedforward axial force $T_{FF}$ degrades more than the estimated accuracy of the feedback axial force $T_{FB}$ can be used. Further, in the control map M8b, in a range where the absolute value of the steering angle δ is equal to or larger than the first setting steering angle δ1 and smaller than the second setting steering angle δ2, the allocation ratio $GF_{3b}$ is linearly decreased according to the absolute value of the steering angle δ. To be specific, in the control map M8b, in a range where the absolute value of the steering angle δ is equal to or larger than the first setting steering angle δ1 and smaller than the second setting steering angle δ2, the allocation ratio $GF_{3b}$ is set in accordance with a linear function representing a relationship between the absolute value of the steering angle δ and the allocation ratio $GF_{3b}$. In the linear function, in a case where the absolute value of the steering angle δ is the first setting steering angle δ1, the allocation ratio $GF_{3b}$ is set to the eighteenth setting value (1.0), and in a case where the absolute value of the steering angle δ is the second setting steering angle δ2, the allocation ratio $GF_3$ is set to the nineteenth setting value (0.6).

Thus, in the case where the absolute value of the steering angle δ is equal to or larger than the first setting steering angle δ1, the final axial force calculating unit 11Bc in one embodiment of the present disclosure makes smaller the allocation ratio $GF_{3b}$ (the allocation ratio GF of the feedforward axial force $T_{FF}$) than that of the case where the absolute value of the steering angle δ is smaller than the first setting steering angle δ1. Accordingly, for example, when the steering angle δ increases and the estimated accuracy of the feedforward axial force $T_{FF}$ degrades, the final axial force calculating unit 11Bc in one embodiment of the present disclosure is capable of increasing the allocation ratio (1−GF) of the feedback axial force $T_{FB}$. Therefore, the final axial force calculating unit 11Bc in one embodiment of the present disclosure is capable of applying a more appropriate steering reaction force.

Figure 18:
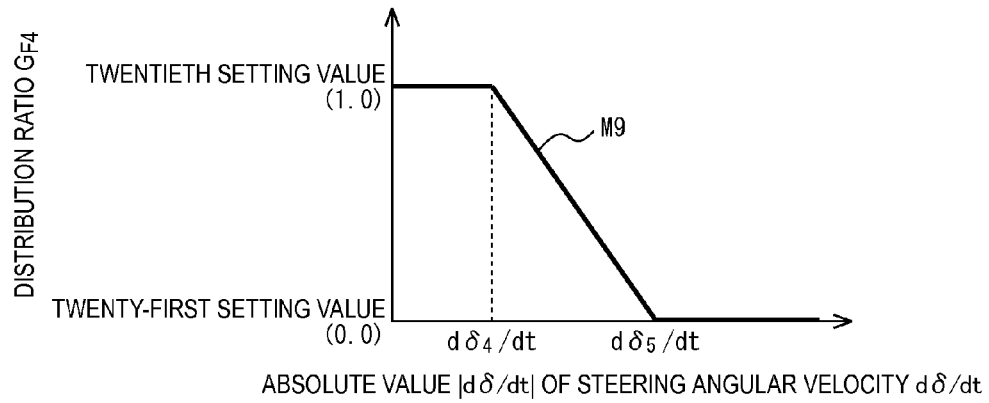
FIG. 18 is a graph representing a control map M9.

FIG. 18 is a graph representing a control map M9. Here, as a method of setting the allocation ratio $GF_4$, for example, a method of reading the allocation ratio $GF_4$ corresponding to the absolute value of the steering angular velocity dδ/dt from the control map M9 can be used. As the control map M9, for example, there is a map in which the allocation ratios $GF_4$ corresponding to the absolute values of the steering angular velocity dδ/dt are registered. To be specific, as illustrated in FIG. 18, in the control map M9, in a range where the absolute value of the steering angular velocity dδ/dt is equal to or larger than 0 and smaller than the fourth setting steering angular velocity $dδ_4/dt$ (>0), the allocation ratio $GF_4$ is set to a twentieth setting value (for example, 1.0) regardless of the magnitude of the steering angular velocity dδ/dt. As the fourth setting steering angular velocity $dδ_4/dt$, for example, the steering angular velocity dδ/dt by which the estimated accuracy of the feedforward axial force $T_{FF}$ starts degrading can be used. Also, in the control map M9, in a range where the absolute value of the steering angular velocity dδ/dt is equal to or larger than a fifth setting steering angular velocity $dδ_5/dt$ (>$dδ_4/dt$), the allocation ratio $GF_4$ is set to a twenty-first setting value (<twentieth setting value. For example, 0.0) regardless of the magnitude of the steering angular velocity dδ/dt. As the fifth setting steering angular velocity $dδ_5/dt$, for example, the steering angular velocity dδ/dt by which the estimated accuracy of the feedforward axial force $T_{FF}$ is lower than the estimated accuracy of the feedback axial force $T_{FB}$ can be used. Further, in the control map M9, in a range where the absolute value of the steering angular velocity dδ/dt is equal to or larger than the fourth setting steering angular velocity dδ$_4$/dt and smaller than the fifth setting steering angular velocity dδ$_5$/dt, the allocation ratio GF$_4$ is linearly decreased according to the absolute value of the steering angular velocity dδ/dt. To be specific, in the control map M9, in the range where the absolute value of the steering angular velocity dδ/dt is equal to or larger than the fourth setting steering angular velocity dδ$_4$/dt and smaller than the fifth setting steering angular velocity dδ$_5$/dt, the allocation ratio GF$_4$ is set in accordance with a linear function representing a relationship between the absolute value of the steering angular velocity dδ/dt and the allocation ratio GF$_4$. In the linear function, when the absolute value of the steering angular velocity dδ/dt is the fourth setting steering angular velocity dδ$_4$/dt, the allocation ratio GF$_4$ is set to the twentieth setting value (1.0), and when the absolute value of the steering angular velocity dδ/dt is the fifth setting steering angular velocity dδ$_5$/dt, the allocation ratio GF$_4$ is set to the twenty-first setting value (0.0).

Thus, in a case where the absolute value of the steering angular velocity dδ/dt is equal to or larger than the fourth setting steering angular velocity dδ$_4$/dt, the final axial force calculating unit 11Bc in one embodiment of the present disclosure makes smaller the allocation ratio GF$_4$ (the allocation ratio GF of the feedforward axial force T$_{FF}$) than that of a case where the absolute value of the steering angular velocity dδ/dt is smaller than the fourth setting steering angular velocity dδ$_4$/dt. Accordingly, for example, when the steering angular velocity dδ/dt increases and the estimated accuracy of the feedforward axial force T$_{FF}$ degrades, the final axial force calculating unit 11Bc in one embodiment of the present disclosure is capable of increasing the allocation ratio (1−GF) of the feedback axial force T$_{FB}$. Therefore, the final axial force calculating unit 11Bc in one embodiment of the present disclosure is capable of applying a more appropriate steering reaction force.

Accordingly, the final axial force calculating unit 11Bc sets the feedforward axial force T$_{FF}$ to the final axial force, when the absolute value of the axial force difference is smaller than the first setting axial force difference Z1, the absolute value of the lateral acceleration Gy is smaller than the first lateral acceleration Gy$_1$, the absolute value of the vehicle velocity V is equal to or larger than the fourth setting vehicle velocity V$_4$, the absolute value of the steering angle δ is smaller than the first setting steering angle δ1, and the absolute value of the steering angular velocity dδ/dt is smaller than the fourth setting steering angular velocity dδ$_4$/dt. In addition, the final axial force calculating unit 11Bc sets the feedback axial force T$_{FB}$ to the final axial force, when at least any one of a case where the absolute value of the axial force difference is equal to or larger than the second setting axial force difference Z2, a case where the absolute value of the lateral acceleration Gy is equal to or larger than the second setting lateral acceleration Gy$_2$, and a case where the absolute value of the steering angular velocity dδ/dt is equal to or larger than the fifth setting steering angular velocity dδ$_5$/dt, is satisfied. Further, the final axial force calculating unit 11Bc sets an added result to the final axial force, the added result being obtained by adding a multiplied value obtained by multiplying the feedforward axial force T$_{FF}$ by the allocation ratio GF and a multiplied value obtained by multiplying the feedback axial force T$_{FB}$ by the allocation ratio (1−GF), when the absolute value of the axial force difference is equal to or larger than the first setting axial force difference Z1 and smaller than the second setting axial force difference Z2, the absolute value of the lateral acceleration Gy is equal to or larger than the first setting lateral acceleration Gy$_1$ and smaller than the second setting lateral acceleration Gy$_2$, the absolute value of the vehicle velocity V is smaller than the fourth setting vehicle velocity V$_4$, the absolute value of the steering angle δ is equal to or larger than the first setting steering angle δ1, and the absolute value of the steering angular velocity dδ/dt is equal to or larger than the fourth setting steering angular velocity dδ$_4$/dt.

Accordingly, when the vehicle A is subject to a situation where the road surface μ of the road is high (dry road surface), the vehicle velocity V is high, the steering angle δ is small, and the steering angular velocity dδ/dt is small (hereinafter, referred to as specified situation), the final axial force calculating unit 11Bc seta the feedforward axial force T$_{FF}$ to the final axial force. Here, since the feedforward axial force T$_{FF}$ does not reflect an influence of the tire lateral force Fd, the feedforward axial force T$_{FF}$ smoothly changes regardless of a change in the road surface. Therefore, the final axial force calculating unit 11Bc is capable of achieving a stable steering feeling when the vehicle A is in the specified situation. In contrast, the final axial force calculating unit 11Bc sets the feedback axial force T$_{FB}$ or an added result obtained by adding the feedforward axial force T$_{FF}$ and the feedback axial force T$_{FB}$, when the vehicle A is in a situation (hereinafter, referred to as ordinary situation) other than the specified situation. Here, since an influence of the tire lateral force Fd applied on the steered wheels 2 is reflected on the feedback axial force T$_{FB}$, the feedback axial force T$_{FB}$ changes depending on a change in the road surface or a change in the vehicle state. Accordingly, when the vehicle A is in the ordinary state, the final axial force calculating unit 11Bc is capable of giving a similar steering feeling to that of a mechanical type of the steering control device in which the steering wheel 1 and the steered wheels 2 are mechanically coupled with each other, so that a natural steering feeling can be achieved.

Returning to FIG. 3, the axial force-steering reaction force converting unit 11Bd calculates a target steering reaction force based on the final axial force that has been calculated by the final axial force calculating unit 11Bc. The target steering reaction is a target value of the steering reaction force. As a method of calculating the target steering reaction force, for example, a method of reading the target steering reaction force corresponding to the vehicle velocity V and the final axial force from the control map M10 can be used. The control map M10 is a map in which the target steering reaction force corresponding to the final axial force is registered for every vehicle velocity V.

Figure 19:
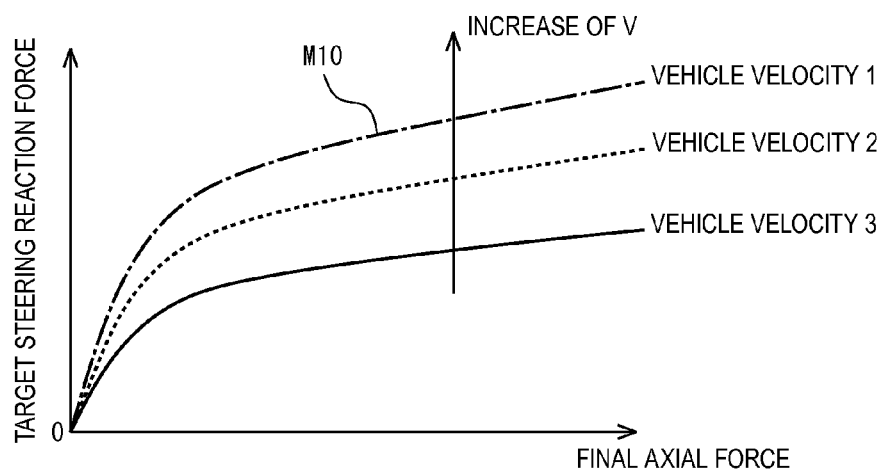
FIG. 19 is a graph representing a control map M10.

FIG. 19 is a graph representing the control map M10. As illustrated in FIG. 19, the control map M10 is set for each vehicle velocity V. In addition, in the control map M10, the target steering reaction force is larger, as the final axial force is larger.

Returning to FIG. 3, the target reaction force current computing unit 11Be calculates the target reaction force electric current according to the following expression (13) based on the target steering reaction force calculated by the axial force-steering reaction force converting unit 11Bd. Then, the target reaction force current computing unit 11Be outputs a calculation result to the reaction force motor drive unit 9C.

The target reaction force current=the target steering reaction force×gain (13)

It is to be noted that in one embodiment of the present disclosure, an example where the target reaction force current computing unit 11Be calculates the target steering reaction force based on the axial force-steering reaction force converting unit 11Bd has been described. However, another configuration can be used. For example, the target reaction force current computing unit 11Be may correct the target steering reaction force by adding a corrective reaction force, an end abutting reaction force, or the like to the target steering reaction force calculated by the axial force-steering reaction force converting unit 11Bd, so as to calculate the target reaction force electric current based on the target steering reaction force that has been corrected. A corrective reaction force, a steering reaction force applied when the target steering reaction force is corrected is given as an example. In addition, as the end-abutting reaction force, a steering reaction force applied when the turning angle θ becomes the maximum is given as an example.

The feedback axial force correcting unit 11Bf determines whether or not the vehicle A is travelling rearward based on the position of the shift lever that has been sensed by the shift sensor 12. Here, when it is detected that the shift lever is in the R range (the position of travelling rearward), the feedback axial force correcting unit 11Bf determines that the vehicle A is travelling rearward. Then, when it is detected that the vehicle A is travelling rearward, the feedback axial force correcting unit 11Bf outputs the feedforward axial force $T_{FF}$ calculated by the feedforward axial force calculating unit 11Ba to the final axial force calculating unit 11Bc, as the feedback axial force $T_{FB}$. On the other hand, when it is detected that the vehicle A is not travelling rearward, the feedback axial force correcting unit 11Bf outputs the feedback axial force $T_{FB}$ calculated by the feedback axial force calculating unit 11Bb to the final axial force calculating unit 11Bc without change.

(Operations and the Like)

Next, an operation of the steering control device of the vehicle A will be described below. While the vehicle A is travelling, it is assumed that a driver operates the steering wheel 1. Then, the control computing unit 11 calculates the target turning angle θ* based on the steering angle δ and the vehicle velocity V (the target turning angle computing unit 11A of FIG. 2). Subsequently, the control computing unit 11 calculates the target turning angle electric current based on a subtraction result obtained by subtracting the actual turning angle θ from the target turning angle θ* that has been calculated (the target turning current computing unit 11C of FIG. 2). Accordingly, the turning control unit 8 turns the steered wheels 2 based on the operation amount of the steering wheel 1.

At the same time, the control computing unit 11 calculates the feedforward axial force $T_{FF}$ based on the steering angle δ and the vehicle velocity V (the feedforward axial force calculating unit 11Ba of FIG. 3). Then, the control computing unit 11 calculates the current axial force based on the turning angle electric current (the electric current axial force calculating unit 11Bba of FIG. 11). Subsequently, the control computing unit 11 calculates the lateral G axial force based on the lateral acceleration Gy (the blend axial force calculating unit 11Bbb of FIG. 11). Then, the control computing unit 11 calculates the yaw rate axial force based on the yaw rate γ and the vehicle velocity V (the blend axial force calculating unit 11Bbb of FIG. 11). Subsequently, the control computing unit 11 calculates the blend axial force $T_{BR}$ based on a value obtained by multiplying the allocation ratio K2 by the electric current axial force that has been calculated, a value obtained by multiplying the allocation ratio K1 by the lateral G axial force, and a value obtained by multiplying the allocation ratio K3 by the yaw rate axial force (the blend axial force calculating unit 11Bbb of FIG. 11). The allocation ratios K1, K2, and K3 of the lateral G axial force, the electric current axial force, and the yaw rate axial force are set to 0.6:0.3:0.1. Then, the control computing unit 11 blends the electric current axial force that has been calculated and the blend axial force $T_{BR}$ at GB:(1−GB), and sets an allocated result to the feedback axial force $T_{FB}$ (the feedback axial force calculating unit 11Bb of FIG. 3).

Then, the control computing unit 11 refers to the control map M6 of FIG. 15, and calculates the allocation ratio $GF_1$ based on the absolute value of the axial force difference (the final axial force calculating unit 11Bc of FIG. 3). Subsequently, the control computing unit 11 refers to the control map M7 of FIG. 16, and calculates the allocation ratio $GF_2$ based on the absolute value of the lateral acceleration Gy (the final axial force calculating unit 11Bc of FIG. 3). Then, the control computing unit 11 refers to the control maps M8a and Mb of FIG. 17, and calculates the allocation ratios $GF_{3a}$, $GF_{3b}$, and $GF_3$ based on the absolute value of the vehicle velocity V and the absolute value of the steering angle δ (the final axial force calculating unit 11Bc of FIG. 3). Subsequently, the control computing unit 11 refers to the control map M9 of FIG. 18, and calculates the allocation ratio $GF_4$ based on the absolute value of the steering angular velocity dδ/dt (the final axial force calculating unit 11Bc of FIG. 3). Then, the control computing unit 11 multiplies a smaller one of the allocation ratio $GF_1$ and the allocation ratio $GF_2$ that have been calculated, the allocation ratio $GF_3$, and the allocation ratio $GF_4$, and sets a multiplication result to the allocation ratio GF. Subsequently, the control computing unit 11 blends the feedforward axial force $T_{FF}$ and the feedback axial force $T_{FB}$ that have been calculated at 1:(1−GF), and calculates the final axial force (the final axial force calculating unit 11Bc of FIG. 3). Then, the control computing unit 11 calculates the target steering reaction force based on the final axial force that has been calculated (the axial force-steering reaction force converting unit 11Bd of FIG. 3). Subsequently, the control computing unit 11 calculates the target reaction force electric current based on the target steering reaction force that has been calculated (the target reaction force electric current computing unit 11Be of FIG. 3). Then, the control computing unit 11 drives the reaction force motor 9A based on the target reaction force electric current that has been calculated (the reaction force motor drive unit 9C of FIG. 2). Accordingly, the reaction force control unit 9 applies a steering reaction force to the steering wheel 1.

In this manner, the steering control device in one embodiment of the present disclosure blends the feedforward axial force $T_{FF}$ and the feedback axial force $T_{FB}$ at allocation ratios $GF_1$, $GF_2$, $GF_3$, and $GF_4$, based on the axial force difference, the lateral acceleration Gy, the vehicle velocity V, the steering angle δ, and the steering angular velocity dδ/dt so as to set the final axial force. Then, the steering control device in one embodiment of the present disclosure applies the steering reaction force based on the final axial force that has been set. Accordingly, since the steering control device in one embodiment of the present disclosure blends the feedforward axial force $T_{FF}$ and the feedback axial force $T_{FB}$ at allocation ratios $GF_1$, $GF_2$, $GF_3$, and $GF_4$, based on the axial force difference, the lateral acceleration Gy, the vehicle velocity V, the steering angle δ, and the steering angular velocity dδ/dt, so that the feedforward axial force $T_{FF}$ and the feedback axial force $T_{FB}$ can be allocated more appropriately. Therefore, the steering control device in one embodiment of the present disclosure is capable of applying a more appropriate steering reaction force.

In one embodiment of the present disclosure, the steering wheel 1 of FIG. 1 corresponds to a steering wheel. Similarly, the turning motor 8A and the turning motor drive unit 8C of FIG. 1 correspond to a turning actuator. In addition, the steering angle sensor 3 of FIG. 1 corresponds to a steering angle detecting unit. Further, the feedforward axial force calculating unit 11Ba of FIG. 1 corresponds to a feedforward axial force calculating unit. Furthermore, the lateral G sensor 6, the yaw rate sensor 7, and the turning current detecting unit 8B of FIG. 1 correspond to a state amount detecting unit. Further, the feedback axial force calculating unit 11Bb of FIG. 3 and the feedback axial force calculation executing unit 11Bbe of FIG. 11 correspond to a feedback axial force calculating unit. Additionally, the vehicle velocity sensor 5 of FIG. 1 corresponds to a vehicle velocity detecting unit. Further, the final axial force calculating unit 11Bc of FIG. 3 corresponds to a steering angular velocity detecting unit. Moreover, the lateral G sensor 6 of FIG. 1 and the final axial force calculating unit 11Bc of FIG. 3 correspond to a final axial force setting unit. Also, the reaction force motor 9A and the reaction force motor drive unit 9C of FIG. 1 and the target reaction force current computing unit 11B of FIG. 2 correspond to a reaction force actuator.

(Effects in the Present Disclosure)

The following effects are brought out in one embodiment of the present disclosure.

(1) The control computing unit 11 blends the feedforward axial force $T_{FF}$ and the feedback axial force $T_{FB}$ at allocation ratios $GF_1$, $GF_2$, $GF_3$, and $GF_4$, based on the axial force difference, the lateral acceleration Gy, the vehicle velocity V, the steering angle δ, and the steering angular velocity dδ/dt so as to set the final axial force. Then, the control computing unit 11 applies the steering reaction force based on the final axial force that has been set.

In such a configuration, since the feedforward axial force $T_{FF}$ and the feedback axial force $T_{FB}$ are allocated at allocation ratios $GF_1$, $GF_2$, $GF_3$, and $GF_4$, based on the axial force difference, the lateral acceleration Gy, the vehicle velocity V, the steering angle δ, and the steering angular velocity dδ/dt, so that the feedforward axial force $T_{FF}$ and the feedback axial force $T_{FB}$ can be allocated more appropriately. Thus, in such a configuration, a more appropriate steering reaction force can be applied.

(2) In the case where the absolute value of the axial force difference is equal to or larger than the first setting axial force difference Z1, the control computing unit 11 makes smaller the allocation ratio GF (the allocation ratio $GF_1$) of the feedforward axial force $T_{FF}$ than that of the case where the absolute value of the axial force difference is smaller than the first setting axial force difference Z1. In such a configuration, for example, when the estimated accuracy of the feedforward axial force $T_{FF}$ degrades and the axial force difference increases, the allocation ratio (1−GF) of the feedback axial force $T_{FB}$ can be increased. Therefore, a more appropriate steering reaction force can be applied.

(3) In the case where the absolute value of the lateral acceleration Gy is equal to or larger than the first setting lateral acceleration $Gy_1$, the control computing unit 11 makes smaller the allocation ratio GF (the allocation ratio $GF_2$) of the feedforward axial force $T_{FF}$ than that of the case where the absolute value of the lateral acceleration Gy is smaller than the first setting lateral acceleration $Gy_1$. In such a configuration, for example, when the lateral acceleration Gy increases and the estimated accuracy of the feedforward axial force $T_{FF}$ degrades, the allocation ratio (1−GF) of the feedback axial force $T_{FB}$ can be increased. Therefore, a more appropriate steering reaction force can be applied.

(4) In the case where the absolute value of the vehicle velocity V is smaller than the fourth setting vehicle velocity $V_4$, the control computing unit 11 makes smaller the allocation ratio GF (the allocation ratio $GF_3$) of the feedforward axial force $T_{FF}$ than that of the case where the absolute value of the vehicle velocity V is larger than the fourth setting vehicle velocity $V_4$. In such a configuration, for example, when the vehicle velocity V decreases and the estimated accuracy of the feedforward axial force $T_{FF}$ degrades, the allocation ratio (1−GF) of the feedback axial force $T_{FB}$ can be increased. Therefore, a more appropriate steering reaction force can be applied.

(5) In the case where the absolute value of the steering angle δ is equal to or larger than the first setting steering angle δ1, the control computing unit 11 makes smaller the allocation ratio GF (the allocation ratio $GF_3$) of the feedforward axial force $T_{FF}$ than that of the case where the absolute value of the steering angle δ is smaller than the first setting steering angle δ1. In such a configuration, for example, when the steering angle δ increases and the estimated accuracy of the feedforward axial force $T_{FF}$ degrades, the allocation ratio (1−GF) of the feedback axial force $T_{FB}$ can be increased. Therefore, a more appropriate steering reaction force can be applied.

(6) In the case where the absolute value of the steering angular velocity dδ/dt is equal to or larger than the fourth setting steering angular velocity $dδ_4/dt$, the control computing unit 11 makes smaller the allocation ratio GF (the allocation ratio $GF_4$) of the feedforward axial force $T_{FF}$ than that of the case where the absolute value of the steering angular velocity dδ/dt is smaller than the fourth setting steering angular velocity $dδ_4/dt$. In such a configuration, for example, when the steering angular velocity dδ/dt increases and the estimated accuracy of the feedforward axial force $T_{FF}$ degrades, it is possible to increase the allocation ratio (1−GF) of the feedback axial force $T_{FB}$. Therefore, a more appropriate steering reaction force can be applied.

Herein, while a limited number of embodiments have been described with illustration, it should be apparent that the present disclosure is not limited to them and modifications and adaptations to each of the embodiments based on the above disclosure may occur to one skilled in the art.

The invention claimed is:

1. A steering control device, comprising:
 a steering wheel mechanically separated from steered wheels;
 a steering angle detecting unit configured to detect a steering angle of the steering wheel;
 a turning actuator configured to turn the steered wheels according to the steering angle detected by the steering angle detecting unit;
 a feedforward axial force calculating unit configured to calculate a feedforward axial force, which is a first axial force that applies a steering reaction force, based on the steering angle detected by the steering angle detecting unit;
 a state amount detecting unit configured to detect a state amount of a vehicle that changes depending on a tire lateral force applied on the steered wheels;
 a feedback axial force calculating unit configured to calculate a feedback axial force, which is a second axial force that returns to a driver a force applied from a road surface to the steering wheel as the steering reaction force, based on the state amount of the vehicle detected by the state amount detecting unit;
 a final axial force setting unit configured to set a final axial force, which is a third axial force obtained, by allocating the feedforward axial force calculated by the feedforward axial force calculating unit and the feedback axial force calculated by the feedback axial force calculating unit at an allocation ratio; and a reaction force actuator configured to apply the steering reaction force based on the final axial force set by the final axial force setting unit, wherein, when an axial force difference exists between the feedforward axial force and the feedback axial force, the final axial force setting unit is configured to make an allocation ratio of the feedforward axial force smaller than when the axial force difference is zero.

2. A steering control device, comprising:
a steering wheel mechanically separated from steered wheels;
a steering angle detecting unit configured to detect a steering angle of the steering wheel;
a turning actuator configured to turn the steered wheels according to the steering angle detected by the steering angle detecting unit;
a feedforward axial force calculating unit configured to calculate a feedforward axial force, which is a first axial force that applies a steering reaction force, based on the steering angle detected by the steering angle detecting unit;
a state amount detecting unit configured to detect a state amount of a vehicle that changes depending on a tire lateral force applied on the steered wheels;
a feedback axial force calculating unit configured to calculate a feedback axial force, which is a second axial force that returns to a driver a force applied from a road surface to the steering wheel as the steering reaction force, based on the state amount of the vehicle detected by the state amount detecting unit;
a final axial force setting unit configured to set a final axial force, which is a third axial force obtained, by allocating the feedforward axial force calculated by the feedforward axial force calculating unit and the feedback axial force calculated by the feedback axial force calculating unit at an allocation ratio;
a reaction force actuator configured to apply the steering reaction force based on the final axial force set by the final axial force setting unit; and
a lateral acceleration detecting unit configured to detect a lateral acceleration exerted on the vehicle,
wherein when an absolute value of the lateral acceleration is equal to or larger than a setting value, the final axial force setting unit is configured to make the allocation ratio of the feedforward axial force smaller than when absolute value of the lateral acceleration is smaller than the setting value.

3. A steering control device, comprising:
a steering wheel mechanically separated from steered wheels;
a steering angle detecting unit configured to detect a steering angle of the steering wheel;
a turning actuator configured to turn the steered wheels according to the steering angle detected by the steering angle detecting unit;
a feedforward axial force calculating unit configured to calculate a feedforward axial force, which is a first axial force that applies a steering reaction force, based on the steering angle detected by the steering angle detecting unit;
a state amount detecting unit configured to detect a state amount of a vehicle that changes depending on a tire lateral force applied on the steered wheels;

a feedback axial force calculating unit configured to calculate a feedback axial force, which is a second axial force that returns to a driver a force applied from a road surface to the steering wheel as the steering reaction force, based on the state amount of the vehicle detected by the state amount detecting unit;
a final axial force setting unit configured to set a final axial force, which is a third axial force obtained, by allocating the feedforward axial force calculated by the feedforward axial force calculating unit and the feedback axial force calculated by the feedback axial force calculating unit at an allocation ratio;
a reaction force actuator configured to apply the steering reaction force based on the final axial force set by the final axial force setting unit; and
a vehicle velocity detecting unit configured to detect a vehicle velocity, wherein when an absolute value of the vehicle velocity is smaller than a setting value, the final axial force setting unit is configured to make the allocation ratio of the feedforward axial force smaller than when the absolute value of the vehicle velocity is equal to or larger than the setting value.

4. A steering control device, comprising:
a steering wheel mechanically separated from steered wheels;
a steering angle detecting unit configured to detect a steering angle of the steering wheel;
a turning actuator configured to turn the steered wheels according to the steering angle detected by the steering angle detecting unit;
a feedforward axial force calculating unit configured to calculate a feedforward axial force, which is a first axial force that applies a steering reaction force, based on the steering angle detected by the steering angle detecting unit;
a state amount detecting unit configured to detect a state amount of a vehicle that changes depending on a tire lateral force applied on the steered wheels;
a feedback axial force calculating unit configured to calculate a feedback axial force, which is a second axial force that returns to a driver a force applied from a road surface to the steering wheel as the steering reaction force, based on the state amount of the vehicle detected by the state amount detecting unit;
a final axial force setting unit configured to set a final axial force, which is a third axial force obtained by allocating the feedforward axial force calculated by the feedforward axial force calculating unit and the feedback axial force calculated by the feedback axial force calculating unit at an allocation ratio; and
a reaction force actuator configured to apply the steering reaction force based on the final axial force set by the final axial force setting unit,
wherein when an absolute value of the steering angle is equal to or larger than a setting value, the final axial force setting unit is configured to make the allocation ratio of the feedforward axial force smaller than when the absolute value of the steering angle is smaller than the setting value.

5. A steering control device, comprising:
a steering wheel mechanically separated from steered wheels;
a steering angle detecting unit configured to detect a steering angle of the steering wheel;
a turning actuator configured to turn the steered wheels according to the steering angle detected by the steering angle detecting unit;

a feedforward axial force calculating unit configured to calculate a feedforward axial force, which is a first axial force that applies a steering reaction force, based on the steering angle detected by the steering angle detecting unit;

a state amount detecting unit configured to detect a state amount of a vehicle that changes depending on a tire lateral force applied on the steered wheels;

a feedback axial force calculating unit configured to calculate a feedback axial force, which is a second axial force that returns to a driver a force applied from a road surface to the steering wheel as the steering reaction force, based on the state amount of the vehicle detected by the state amount detecting unit;

a final axial force setting unit configured to set a final axial force, which is a third axial force obtained by allocating the feedforward axial force calculated by the feedforward axial force calculating unit and the feedback axial force calculated by the feedback axial force calculating unit at an allocation ratio;

a reaction force actuator configured to apply the steering reaction force based on the final axial force set by the final axial force setting unit; and a steering angular velocity detecting unit configured to detect a steering angular velocity of the steering wheel, wherein when an absolute value of the steering angular velocity is equal to or larger than a setting value, the final axial force setting unit is configured to make the allocation ratio of the feedforward axial force smaller than when the absolute value of the steering angular velocity is smaller than the setting value.

* * * * *